United States Patent
Yashita et al.

(10) Patent No.: US 12,441,959 B2
(45) Date of Patent: Oct. 14, 2025

(54) COMPOSITION CONTAINING ORGANIC AMMONIUM SALT

(71) Applicant: MIYOSHI OIL & FAT CO., LTD., Tokyo (JP)

(72) Inventors: Akira Yashita, Tokyo (JP); Koji Kawai, Tokyo (JP)

(73) Assignee: MIYOSHI OIL & FAT CO., LTD., Tokyo (JP)

( * ) Notice: Subject to any disclaimer, the term of this patent is extended or adjusted under 35 U.S.C. 154(b) by 781 days.

(21) Appl. No.: 17/426,489

(22) PCT Filed: Feb. 13, 2020

(86) PCT No.: PCT/JP2020/005641
§ 371 (c)(1),
(2) Date: Jul. 28, 2021

(87) PCT Pub. No.: WO2020/166674
PCT Pub. Date: Aug. 20, 2020

(65) Prior Publication Data
US 2022/0098515 A1 Mar. 31, 2022

(30) Foreign Application Priority Data
Feb. 13, 2019 (JP) .................. 2019-023758

(51) Int. Cl.
| | |
|---|---|
| C11D 1/00 | (2006.01) |
| A61K 8/06 | (2006.01) |
| A61K 8/36 | (2006.01) |
| A61K 8/39 | (2006.01) |
| A61K 8/41 | (2006.01) |
| A61K 8/44 | (2006.01) |
| A61K 9/107 | (2006.01) |
| A61K 47/12 | (2006.01) |
| A61K 47/18 | (2017.01) |
| A61K 47/44 | (2017.01) |
| A61Q 19/00 | (2006.01) |
| C11D 1/62 | (2006.01) |
| C11D 1/65 | (2006.01) |
| C11D 3/26 | (2006.01) |

(52) U.S. Cl.
CPC ............. *C11D 1/62* (2013.01); *A61K 8/416* (2013.01); *C11D 1/65* (2013.01)

(58) Field of Classification Search
CPC .... C11D 1/00; C11D 1/62; C11D 1/65; C11D 3/2003; C11D 3/26; A61Q 19/00; A61K 8/06; A61K 8/36; A61K 8/39; A61K 8/41; A61K 8/44; A61K 9/107; A61K 47/12; A61K 47/18; A61K 47/44
See application file for complete search history.

(56) References Cited

U.S. PATENT DOCUMENTS

| | | | | |
|---|---|---|---|---|
| 6,869,977 | B1 * | 3/2005 | O'Lenick, Jr. ......... | A61Q 19/00 514/642 |
| 2006/0088495 | A1 * | 4/2006 | Harichian ............. | A61Q 15/00 424/70.28 |
| 2009/0297466 | A1 | 12/2009 | Gutmann et al. | |
| 2018/0021233 | A1 * | 1/2018 | Murata .................. | A61K 8/31 510/136 |
| 2022/0096349 | A1 * | 3/2022 | Kaneko ................. | A61K 8/19 |

FOREIGN PATENT DOCUMENTS

| | | |
|---|---|---|
| JP | H08508021 A | 8/1996 |
| JP | H08508055 A | 8/1996 |
| JP | 2008-517881 A | 5/2008 |
| JP | 2009-529012 A | 8/2009 |
| JP | 2014131974 A | 7/2014 |
| JP | 2014131975 A | 7/2014 |
| JP | 2019023185 A | 2/2019 |
| WO | 9421226 A1 | 9/1994 |
| WO | WO-0164180 A1 * | 9/2001 ............ A61K 8/416 |
| WO | 2014171507 A1 | 10/2014 |
| WO | 2019/022869 A1 | 1/2019 |

OTHER PUBLICATIONS

Extended European Search Report for European Application No. 20756672.0, dated Apr. 26, 2022.
Notification of Reasons for Refusal for Japanese Application No. 2020-572316, dated Jun. 20, 2023.

* cited by examiner

Primary Examiner — Brian P Mruk
(74) Attorney, Agent, or Firm — Fox Rothschild LLP

(57) ABSTRACT

Provided is a novel composition with excellent stability which contains an organic ammonium salt. The composition containing an organic ammonium salt of the present invention contains an organic ammonium salt having a hydrogen-bonding functional group(s) in a cation and/or an anion, and a surfactant.

15 Claims, No Drawings

COMPOSITION CONTAINING ORGANIC AMMONIUM SALT

CROSS-REFERENCE TO RELATED APPLICATIONS

This application is a § 371 national phase entry of International Patent Application No. PCT/JP2020/005641, filed on Feb. 13, 2020, which claims priority to and the benefit of Japanese Patent Application No. 2019-023758, filed on Feb. 13, 2019, both of which are hereby incorporated herein by reference in their entireties.

TECHNICAL FIELD

The present invention relates to a composition containing an organic ammonium salt.

BACKGROUND ART

Water and moisture retention agents are used for the purpose of retaining water content in, for example, soil, greening material, paper, skin and/or hair to prevent drying of them. In terms of an application in soil, these are used for agricultural purposes, i.e., for enhancing water-retaining capacity in gardening soil to make an improvement in watering effect. In terms of an application in a greening material, these are compounded for enhancing water retaining capacity in a greening material that is used for the purpose of greening, for example, a rooftop or wall of a building, or a river bank. In terms of an application in paper, these are mixed in a coating liquid for a coated paper to prevent problems such as printing failure or paper breakage in a printing process which is caused by dryness in paper, or are used to improve moistening capacity in tissue paper for the purpose of retaining a pleasant feel. In terms of an application in cosmetics for skin or hair, these are mixed for the purpose of retaining moisture to provide a moist feeling with moisture. Water and moisture retention agents have been used to retain moisture for other various purposes. Multivalent alcohols, such as glycerin and sorbitol have been known as such water and moisture retention agents. However, these have problems that there may not be achieved a satisfactory water and moisture retention property under a low-humidity environment such as an environment involving dryness during the winter season, and the water and moisture retention property might not be able to be maintained for a long period of time due to the volatility of the agent.

Meanwhile, for convenience of use, compositions used in, for example, cosmetics, pharmaceuticals, quasi-drugs, paints, lubricants, inks are not limited to liquids; gel-like compositions and emulsified compositions are desired. These compositions are required to have a stability in resisting, for example, aging, a physical load such as shearing, and heating, and to enhance the additive amount of an active ingredient(s).

For example, such gel-like and emulsified compositions are expected to have a low fluidity and to remain in an applied region over a long period of time while maintaining a fluidity that is sufficient to uniformly apply the same in a thin layer to thereby provide advantages of, for example, water and moisture retention property. For example, various methods for adding surfactants and polymer compounds are being studied to improve the stability of an emulsification composition. Emulsification compositions are roughly classified into a water-in-oil (W/O) type and an oil-in-water (O/W) type. Among these types, the water-in-oil (W/O) type composition is composed of a continuous phase of oil and a disperse phase of water so that it easily repels water and has an effect of protecting a coated object from water, and therefore is expected to be widely used in the cosmetics and pharmaceutical fields. However, in the case where the water content is increased in order to provide a lightweight feel, there has been a problem that the stability of an emulsification composition becomes low and the water is easily separated.

PRIOR ART DOCUMENTS

Patent Documents

Patent document 1: WO2014/171507

SUMMARY OF THE INVENTION

Problems to be Solved by the Invention

Conventionally, multivalent alcohols are known for such water and moisture retention agents; a composition having a higher water and moisture retention capability has been longed for. Moreover, when using the composition, further improvements have been desired in water-retaining and moisturizing effects when the composition is used as a water retention or for the effects of active ingredients when the active ingredients are dissolved thereinto so that the effects of the active ingredients remain without being volatilized to thereby exhibit these effects for a long period of time. It is also desired that the solubility of the active ingredient be increased in order to enhance the effect of the active ingredients.

Further, when such a composition is used in the fields of, for example, cosmetics, pharmaceuticals, quasi-drugs, paints, lubricants and inks, the composition is desired to be not in the form of liquid but of an emulsification composition or a gel to improve convenience; particularly in the field of cosmetics, pharmaceuticals and quasi-drugs, there has been desired a product having a stretchability when applied to the skin, a non-stickiness, a moisture retention feeling and a skin compatibility. Further, in various fields such as cosmetics or inks, it has been desired to stably dissolve or disperse an organic or inorganic additive into a disperse or continuous phase. The antistatic effect is also required in some intended uses.

Means to Solve the Problems

In order to solve the aforementioned problems, the composition of the present invention is characterized by containing an organic ammonium salt having a hydrogen-bonding functional group(s) in a cation and/or an anion, and a surfactant.

In a preferred embodiment, the cation is an ammonium cation. In a preferred embodiment, the ammonium cation is represented by the following formula (I):

[Chemical formula 1]

$$N^+[R^1]_n[R^2]_{4-n} \quad (I)$$

wherein each $R^1$ independently represents a hydroxyalkyl group in which there is at least one hydroxy group, an alkyl moiety is a linear or branched moiety having 1 to 10 carbon atoms, and the alkyl moiety may contain an oxygen atom(s); a carboxyalkyl group in which there is at least one carboxy group, an alkyl moiety is a linear or branched moiety having 1 to 10 carbon atoms, and the alkyl moiety may contain an oxygen atom(s); or a hydroxycarboxyalkyl group in which there are at least one hydroxy group and at least one carboxy group, an alkyl moiety is a linear or branched moiety having 1 to 10 carbon atoms, and the alkyl moiety may contain an oxygen atom(s), and wherein each $R^2$ independently represents a hydrogen atom or a linear or branched alkyl group having 1 to 18 carbon atoms, and n represents an integer of 0 to 4.

In a preferred embodiment, n represents an integer of 0 to 4. In a particularly preferred embodiment, $R^1$ represents a linear or branched monohydroxyalkyl, monocarboxyalkyl, or monohydroxycarboxyalkyl group having 1 to 10 carbon atoms, wherein n represents an integer of 0 to 4. In a preferred embodiment among them, $R^2$ represents a hydrogen atom. Alternatively, in another preferred embodiment, $R^2$ represents a linear or branched alkyl group having 1 to 18 carbon atoms.

Alternatively, in another preferred embodiment, at least one $R^1$ represents a linear or branched polyhydroxyalkyl group having 1 to 10 carbon atoms and at least two hydroxy groups, and n represents an integer of 1 to 4. In a particularly preferred embodiment, $R^2$ represents a hydrogen atom.

In a preferred embodiment of the emulsification composition of the present invention, the anion is a carboxylic acid-based anion. More preferably, a hydrogen-bonding functional group(s) is present in the anion. In a particularly preferred embodiment, the hydrogen-bonding functional group(s) is any one of a hydroxy group, a carboxy group and a carboxylate group.

In a preferred embodiment, the composition of the present invention further comprises an oil agent.

In a preferred embodiment, the composition further comprises water, and wherein the composition is an emulsification composition.

In a preferred embodiment, an anhydride and hydrate of the organic ammonium salt of the present invention are liquid at 25° C.

Effects of the Invention

The composition of the present invention contains an organic ammonium salt having a hydrogen-bonding functional group(s) in a cation and/or an anion, and a surfactant to thereby provide an excellent water and moisture retention property, an excellent solubility and dispersibility of an organic or inorganic additive, and an excellent antistatic performance (static protection property).

The emulsification composition of the present invention contains an organic ammonium salt having a hydrogen-bonding functional group(s) in a cation and/or an anion to thereby improve stability. Further, in the case where the composition is to be used as a water and moisture retention agent, it is excellent in water and moisture retaining effect, and in the case where the active ingredients are to be dissolved therein, the composition improves the solubility of the active ingredients. Further, as the organic ammonium salt is nonvolatile, the composition remains in an applied region without being volatilized to thereby exhibit the effects of the active ingredients for a long period of time. The composition of the present invention may be in the form of an emulsification composition or a gel depending on the intended use to thereby improve convenience.

Further, as the emulsification composition of the present invention is excellent in stretchability when applied to the skin, non-stickiness, moisture retention feeling and skin compatibility, it can be suitably used in cosmetics, pharmaceuticals and quasi-drugs.

MODE FOR CARRYING OUT THE INVENTION

The present invention is described in detail hereunder.

The composition of the present invention contains an organic ammonium salt having a hydrogen-bonding functional group(s) in a cation and/or an anion, and a surfactant. (an Organic Ammonium Salt Having a Hydrogen-Bonding Functional Group(s) in a Cation and/or an Anion)

In the present invention, the organic ammonium salt contains an organic cation or $NH_4^+$ with a nitrogen atom being an ion center, and/or an organic anion.

Although not particularly limited, as a cation(s) of the organic ammonium salt, there may be listed a cation with a nitrogen atom being an ion center, such as an ammonium cation (organic ammonium cation $NR_4^+$ substituted by an organic group(s) (at least one R is an organic group, while the rest of them are hydrogen atoms) and $NH_4^+$); and a cation other than the ammonium cation, such as a cation(s) of the organic ammonium salt with the nitrogen atom therein being substituted by an organic group, examples of which include an imidazolium cation, pyridinium cation, pyrrolidinium cation, piperidinium cation, pyrrolinium cation, pyrazinium cation, triazolium cation, isoquinolinium cation, oxazolinium cation, thiazolinium cation, morpholinium cation, guanidium cation, pyrimidinium cation, piperazinium cation, triadinium cation, quinolinium cation, indolinium cation, quinoxalinium cation, isooxazolium cation and cationic amino acid. Among them, preferred are an ammonium cation, imidazolium cation, pyridinium cation, pyrrolidinium cation, piperidinium cation and morpholinium cation; more preferred are an ammonium cation and imidazolium cation; even more preferred is an ammonium cation. Here, the cations exemplified above are listed as collective terms for cations including cations having a substituent group(s) such as a hydrogen-bonding functional group other than the cations having the basic structures described above.

It is preferred that the organic ammonium salt used in the present invention have a hydrogen-bonding functional group(s) in a cation.

Although not particularly limited, examples of the hydrogen-bonding functional group include an oxygen-containing group, a nitrogen-containing group, a sulfur-containing group, a phosphorus-containing group, and a hydrogen atom directly bonded to nitrogen.

Although not particularly limited, examples of the oxygen-containing group include a hydroxy group, a carbonyl group, an ether group, an ester group, an aldehyde group, a carboxy group, a carboxylate group, a urea group, a urethane group, an amide group, an oxazole group, a morpholine group, a carbamic acid group and a carbamate group.

Although not particularly limited, examples of the nitrogen-containing group include an amino group and a nitro group.

Although not particularly limited, examples of the sulfur-containing group include a sulfate group (—O—S(=O)$_2$—O—), a sulfonyl group (—S(=O)$_2$O—), a sulfonic acid group (—S(=O)$_2$—), a mercapto group (—SH), a thioether group (—S—), a thiocarbonyl group (—C(=S)—), a thiourea group (—N—C(=S)—N—), a thiocarboxy group (—C(=S)OH), a thiocarboxylate group (—C(=S)O—), a dithiocarboxy group (—C(=S)SH) and a dithiocarboxylate group (—C(=S)S—).

Although not particularly limited, examples of the phosphorus-containing group include a phosphate group (—O—P(=O)(—O—)—O—), a phosphonic acid group (—P(=O)(—O—)—O—), a phosphinic acid group (—P(=O)—O—), a phosphite group (—O—P(—O—)—O—), a phosphonous acid group (—P(—O—)—O—), a phosphinous acid group (—P—O—) and a pyrophosphate group [(—O—P(=O)(—O—))$_2$—O—].

Among them, as a hydrogen-bonding functional group(s) present in a cation, preferred are a hydroxy group, a carboxy group, a carboxylate group, an ester group, an ether group and a hydrogen atom directly bonded to nitrogen.

Among them, more preferred are a hydroxy group, a carboxy group, a carboxylate group, an ether group and a hydrogen atom directly bonded to nitrogen; even more preferred are a hydroxy group, a carboxy group, a carboxylate group and a hydrogen atom directly bonded to nitrogen; particularly preferred are a hydroxy group and a hydrogen atom directly bonded to nitrogen.

Further, the composition may contain an alkyl group in which a hydrogen-bonding functional group(s) is present in the cation, and examples of such alkyl group to which a hydrogen-bonding functional group(s) is bonded include a hydroxyalkyl group, carboxyalkyl group and hydroxycarboxyalkyl group.

The aforementioned hydroxyalkyl group has at least one hydroxy group, and the alkyl moiety thereof is a linear or branched moiety having preferably 1 to 10, more preferably 1 to 6, even more preferably 1 to 3 carbon atoms; the alkyl moiety is preferably a linear moiety; such alkyl moiety may also contain an oxygen atom(s).

The aforementioned carboxyalkyl group has at least one carboxy group, and the alkyl moiety thereof is a linear or branched moiety having preferably 1 to 10, more preferably 1 to 6, even more preferably 1 to 3 carbon atoms; the alkyl moiety is preferably a linear moiety; such alkyl moiety may also contain an oxygen atom(s).

The aforementioned hydroxycarboxyalkyl group has at least one hydroxy group and at least one carboxy group, and the alkyl moiety thereof is a linear or branched moiety having preferably 1 to 10, more preferably 1 to 6, even more preferably 1 to 3 carbon atoms; the alkyl moiety is preferably a linear moiety; such alkyl moiety may also contain an oxygen atom(s).

Here, when the alkyl moiety contains an oxygen atom(s), such oxygen atom(s), for example, form, in the alkyl moiety, an ether bond, a carbonyl group, an ester bond, an amide bond, a urea bond or a urethane bond. Therefore, in this invention, the expression "the alkyl moiety contains an oxygen atom(s)" encompasses a case where the alkyl moiety is interrupted by, or the hydrogen atom(s) are substituted by a group serving as an oxygen atom-containing atom group that contains a hetero atom(s) such as a nitrogen atom.

Examples of the above hydroxyalkyl group include a monohydroxyalkyl group and a polyhydroxyalkyl group; and specific examples thereof include a hydroxyalkyl group where an oxygen atom(s) is not contained in their alkyl moieties, a hydroxyalkoxyalkyl group, an alkoxyhydroxyalkyl group and a hydroxypolyalkyleneoxyalkyl group. Alternatively, each alkyl moieties may contain an oxygen atom(s).

Although not particularly limited, examples of the monohydroxyalkyl group include a hydroxymethyl group, 1-hydroxyethyl group, 2-hydroxyethyl group, 1-hydroxypropane-1-yl group, 2-hydroxypropane-1-yl group, 3-hydroxypropane-1-yl group, 1-hydroxypropane-2-yl group, 2-hydroxypropane-2-yl group, 1-hydroxybutane-1-yl group, 2-hydroxybutane-1-yl group, 3-hydroxybutane-1-yl group, 4-hydroxybutane-1-yl group, 1-hydroxy-2-methylpropane-1-yl group, 2-hydroxy-2-methylpropane-1-yl group, 3-hydroxy-2-methylpropane-1-yl group, 1-hydroxybutane-2-yl group, 2-hydroxybutane-2-yl group, 3-hydroxybutane-2-yl group, 4-hydroxybutane-2-yl group, 1-hydroxy-2-methylpropane-2-yl group, 5-hydroxypentane-1-yl group, 6-hydroxyhexane-1-yl group, 7-hydroxyheptane-1-yl group, 8-hydroxyoctane-1-yl group, 9-hydroxynonane-1-yl group and 10-hydroxydecane-1-yl group. The monohydroxyalkyl group preferably has 1 to 10 carbon atoms, more preferably 1 to 6 carbon atoms, even more preferably 1 to 3 carbon atoms.

Although not particularly limited, examples of the polyhydroxyalkyl group include a di-, tri-, tetra-, penta-, hexa-, hepta- or octahydroxyalkyl group. Although not particularly limited, specific examples thereof include dihydroxyethyl groups such as 1,2-dihydroxyethyl group; dihydroxypropane-1-yl groups such as 1,2-dihydroxypropane-1-yl group and 2,3-dihydroxypropane-1-yl group; dihydroxypropane-2-yl groups such as 1,2-dihydroxypropane-2-yl group and 1,3-dihydroxypropane-2-yl group; trihydroxypropane-1-yl group; trihydroxypropane-2-yl group; dihydroxybutane-1-yl groups such as 1,2-dihydroxybutane-1-yl group, 1,3-dihydroxybutane-1-yl group, 1,4-dihydroxybutane-1-yl group, 2,3-dihydroxybutane-1-yl group, 2,4-dihydroxybutane-1-yl group and 3,4-dihydroxybutane-1-yl group; trihydroxybutane-1-yl groups such as 1,2,3 trihydroxybutane-1-yl group, 1,2,4 trihydroxybutane-1-yl group, 1,3,4 trihydroxybutane-1-yl group and 2,3,4 trihydroxybutane-1-yl group; tetrahydroxybutane-1-yl group; dihydroxy-2-methylpropane-1-yl groups such as 1,2-dihydroxy-2-methylpropane-1-yl group, 1,3-dihydroxy-2-methylpropane-1-yl group and 2,3-dihydroxy-2-methylpropane-1-yl group; trihydroxy-2-methylpropane-1-yl group; tetrahydroxy-2-methylpropane-1-yl group; dihydroxybutane-2-yl groups such as 1,2-dihydroxybutane-2-yl group, 1,3-dihydroxybutane-2-yl group, 1,4-dihydroxybutane-2-yl group, 2,3-dihydroxybutane-2-yl group, 2,4-dihydroxybutane-2-yl group and 3,4-dihydroxybutane-2-yl group; trihydroxybutane-2-yl groups such as 1,2,3 trihydroxybutane-2-yl group, 1,2,4 trihydroxybutane-2-yl group, 1,3,4 trihydroxybutane-2-yl group and 2,3,4 trihydroxybutane-2-yl group; tetrahydroxybutane-2-yl group; 1,3-dihydroxy-2-methylpropane-2-yl group, 1,3-dihydroxy-2-ethylpropane-2-yl group, 1,3-dihydroxy-2-hydroxymethylpropane-2-yl group; di-, tri-, tetra- or pentahydroxypentane-1-yl group; di-, tri-, tetra-, penta- or hexahydroxyhexane-1-yl group; di-, tri-, tetra-, penta-, hexa- or heptahydroxyheptane-1-yl group; and di-, tri-, tetra-, penta-, hexa-, hepta- or octahydroxyoctane-1-yl group.

It is preferred that the polyhydroxyalkyl group have 2 to 8 hydroxy groups, and 1 to 10, preferably 1 to 6 carbon atoms. Further, one preferable example is a branched polyhydroxyalkyl group represented by the following formula,

[Chemical formula 2]

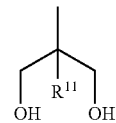

where, in this formula, R$^{11}$ represents a hydrogen atom, a linear alkyl group having 1 to 4 carbon atoms, or a linear monohydroxyalkyl group having 1 to 4 carbon atoms.)

Among the above polyhydroxyalkyl groups, preferred are 2,3-dihydroxypropane-1-yl group, 1,3-dihydroxypropane-2-yl group, 1,3-dihydroxy-2-hydroxymethylpropane-2-yl group and pentahydroxyhexane-1-yl group.

Examples of the aforementioned carboxyalkyl group include a monocarboxyalkyl group and a polycarboxyalkyl group. Specific examples thereof include groups having a structure equivalent to those obtained by substituting the hydroxy groups in any of the mono-, di-, tri-, tetra-, penta-, hexa-, hepta- or octahydroxyalkyl groups exemplified above with a carboxy group(s) (alkyl moieties of such groups may contain oxygen atoms).

Although not particularly limited, examples of the monocarboxyalkyl group include a carboxymethyl group, 1-carboxyethyl group, 2-carboxyethyl group, 1-carboxypropane-1-yl group, 2-carboxypropane-1-yl group, 3-carboxypropane-1-yl group, 1-carboxypropane-2-yl group, 2-carboxypropane-2-yl group, 1-carboxybutane-1-yl group, 2-carboxybutane-1-yl group, 3-carboxybutane-1-yl group, 4-carboxybutane-1-yl group, 1-carboxy-2-methylpropane-1-yl group, 2-carboxy-2-methylpropane-1-yl group, 3-carboxy-2-methylpropane-1-yl group, 1-carboxybutane-2-yl group, 2-carboxybutane-2-yl group, 3-carboxybutane-2-yl group, 4-carboxybutane-2-yl group, 1-carboxy-2-methylpropane-2-yl group, 5-carboxypentane-1-yl group, 6-carboxyhexane-1-yl group, 7-carboxyheptane-1-yl group, 8-carboxyoctane-1-yl group, 9-carboxynonane-1-yl group, 10-carboxydecane-1-yl group. The carboxyalkyl group has preferably 1 to 10, more preferably 1 to 6 carbon atoms.

Although not particularly limited, examples of the above-mentioned hydroxycarboxyalkyl group include groups having a structure equivalent to those obtained by substituting part of the hydroxy groups in any of the di-, tri-, tetra-, penta-, hexa-, hepta- or octahydroxyalkyl groups exemplified above with a carboxy group(s) (alkyl moieties of such groups may contain oxygen atoms). Examples of the monohydroxycarboxyalkyl group having one hydroxy group and one carboxy group, include 2-hydroxy-3-carboxybutane-1-yl group (carnitine), 1-hydroxyethyl-2-carboxyethyl group (serine) and 2-hydroxyethyl-2-carboxyethyl group (threonine). As the hydroxycarboxyalkyl group, 2-hydroxy-3-carboxybutane-1-yl group (carnitine) is preferred.

As a functional group other than the hydrogen-bonding functional group(s) present in a cation, there may be employed, for example, an alkyl group. It is preferred that such alkyl group be a linear or branched group having 1 to 18 carbon atoms, more preferably a linear or branched group having 1 to 12 carbon atoms, even more preferably a linear or branched group having 1 to 8 carbon atoms, particularly preferably a linear or branched group having 1 to 4 carbon atoms. Although not particularly limited, examples of the alkyl group include a methyl group, ethyl group, propane-1-yl group, propane-2-yl group, butane-1-yl group, 2-methylpropane-1-yl group, butane-2-yl group, 2-methylpropane-1-yl group, pentane-1-yl group, 1-methylbutane-1-yl group, 2-methylbutane-1-yl group, 3-methylbutane-1-yl group, 1-ethylbutane-1-yl group, 1,1-dimethylpropane-1-yl group, 1,2-dimethylpropane-1-yl group, 2,2-dimethylpropane-1-yl group, hexane-1-yl group, heptane-1-yl group, octane-1-yl group, octane-1-yl group, nonane-1-yl group, decane-1-yl group, dodecane-1-yl group, tetradecane-1-yl group, hexadecane-1-yl group and octadecane-1-yl group.

In terms of achieving the effects of the present invention, it is preferred that at least one hydrogen-bonding functional group-containing alkyl group and/or hydrogen atom directly bonded to nitrogen be present in the cation of the organic ammonium salt used in the present invention. In this case, at least one moiety in the cation into which a functional group can be introduced (atoms contained in chemical structures as basic skeletons, such as a nitrogen moiety, and a carbon moiety composing a ring together with nitrogen) may be substituted by a hydrogen-bonding functional group-containing alkyl group(s), while the rest of those moieties may be substituted by an alkyl group(s). The aforementioned hydrogen-bonding functional group is preferably a hydroxy group.

As the cation of the organic ammonium salt, preferred are an ammonium cation, imidazolium cation, pyridinium cation, pyrrolidinium cation, piperidinium cation and morpholinium cation, among which an ammonium cation and imidazolium cation are more preferred, and an ammonium cation is even more preferred. An ammonium cation represented by the formula (I) is even more preferred.

According to the emulsification composition of the present invention, it is preferred that the cation of the organic ammonium salt is an ammonium cation represented by the formula (I),

[Chemical formula 3]

$$N^+[R^1]_n[R^2]_{4-n} \qquad (I)$$

wherein each $R^1$ independently represents a hydroxyalkyl group in which there is at least one hydroxy group, an alkyl moiety is a linear or branched moiety having 1 to 10 carbon atoms, and the alkyl moiety may contain an oxygen atom(s); a carboxyalkyl group in which there is at least one carboxy group, an alkyl moiety is a linear or branched moiety having 1 to 10 carbon atoms, and the alkyl moiety may contain an oxygen atom(s); or a hydroxycarboxyalkyl group in which there are at least one hydroxy group and at least one carboxy group, an alkyl moiety is a linear or branched moiety having 1 to 10 carbon atoms, and the alkyl moiety may contain an oxygen atom(s), and wherein each $R^2$ independently represents a hydrogen atom or a linear or branched alkyl group having 1 to 18 carbon atoms, and n represents an integer of 0 to 4.

In the formula (I), it is preferred that n be an integer of 1 to 4, and it is more preferred that $R^1$ represents a linear or branched monohydroxyalkyl, monocarboxyalkyl or monohydroxycarboxyalkyl group (particularly preferably a hydroxyalkyl group) having 1 to 10 (preferably 1 to 6, more preferably 1 to 3) carbon atoms. In this case, it is preferred that $R^2$ be a hydrogen atom. Further, it is preferred that $R^2$ be a linear or branched alkyl group having 1 to 18, preferably 1 to 8, even more preferably 1 to 4 carbon atoms.

In the formula (I), it is preferred that at least one $R^1$ represents a linear or branched polyhydroxyalkyl group having 1 to 10 (preferably 1 to 6) carbon atoms and having at least two (preferably 2 to 8, more preferably 2 to 5) hydroxy groups, and wherein n represents an integer of 1 to 4 (preferably 1 to 2). In this case, it is preferred that $R^2$ be a hydrogen atom.

Although not particularly limited, examples of anions of the organic ammonium salt used in the present invention include a halogen-based anion, a sulfur-based anion, a phosphorus-based anion, a cyan-based anion, a boron-based anion, a fluorine-based anion, a nitrogen oxide-based anion and a carboxylic acid-based anion, among which preferred are a halogen-based anion, a boron-based anion and a carboxylic acid-based anion, and more preferred is a carboxylic acid-based anion.

Although not particularly limited, examples of the halogen-based anion include a chloride ion, bromide ion and iodine ion.

Although not particularly limited, examples of the sulfur-based anion include a sulfonate anion, a hydrogen sulfonate anion, an alkyl sulfonate anion (e.g. methanesulfonate, ethyl sulfonate, butyl sulfonate, benzene sulfonate, p-toluene sulfonate, 2,4,6-trimethylbenzene sulfonate, styrene sulfonate, 3-sulfopropyl methacrylate anion and 3-sulfopropyl acrylate), a sulfate anion, a hydrogen sulfate anion and an alkyl sulfate anion (e.g. methyl sulfate anion, ethyl sulfate anion, butyl sulfate anion, octyl sulfate anion and 2-(2-methoxyethoxy)ethyl sulfate anion).

Although not particularly limited, examples of the phosphorus-based anion include a phosphate anion, a hydrogen phosphate anion, a dihydrogen phosphate anion, a phosphonate anion, a hydrogen phosphonate anion, a dihydrogen phosphonate anion, a phosphinate anion, a hydrogen phosphinate anion, an alkyl phosphate anion (e.g. dimethylphosphate, diethylphosphate, dipropylphosphate anion and dibutylphosphate anion), an alkyl phosphonate anion (e.g. methylphosphonate anion, ethylphosphonate anion, propylphosphonate anion, butylphosphonate anion and methylmethylphosphonate anion), an alkylphosphinate anion and a hexaalkylphosphate anion.

Although not particularly limited, examples of the cyan-based anion include a tetracyanoborate anion, a dicyanamide anion, a thiocyanate anion and an isothiocyanate anion.

Although not particularly limited, examples of the boron-based anion include a tetrafluoroborate anion, a bisoxalateborate anion and a tetraalkylborate anion such as a tetraphenylborate anion.

Although not particularly limited, examples of the fluorine-based anion include a bis(fluorosulfonyl)imide anion, a bis(perfluoroalkylsulfonyl)imide anion (e.g. bis(trifluoromethylsulfonyl)imide anion, bis(pentafluoroethylsulfonyl)imide, bis(heptafluoropropanesulfonyl)imide anion and bis(nonafluorobutylsulfonyl)imide), a perfluoroalkyl sulfonate anion (e.g. trifluoromethane sulfonate anion, pentafluoroethane sulfonate anion, heptafluoropropane sulfonate anion, nonaflate anion and perfluoro octane sulfonate anion), a fluorophosphate anion (e.g. hexafluorophosphate anion and tri(pentafluoroethyl)trifluorophosphate anion), a tris(perfluoroalkylsulfonyl)methide anion (e.g. tris(trifluoromethanesulfonyl)methide anion, tris(pentafluoroethanesulfonyl)methide anion, tris(heptafluoropropanesulfonyl)methide anion and tris(nonafluorobutanesulfonyl)methide anion) and a fluorohydrogenate anion.

Although not particularly limited, examples of the nitrogen oxide-based anion include a nitrate anion and a nitrite anion.

The aforementioned carboxylic acid-based anion is an organic acid anion that has, in one molecule, at least one carboxylic acid anion (—COO⁻), and may contain a heteroatom-containing group such as an oxygen-containing group, a nitrogen-containing group and a sulfur-containing group. Although not particularly limited, examples of the carboxylic acid-based anion include a saturated aliphatic carboxylic acid anion, an unsaturated aliphatic carboxylic acid anion, an alicyclic carboxylic acid anion, an aromatic carboxylic acid anion, a saturated aliphatic hydroxycarboxylic acid anion, an unsaturated aliphatic hydroxycarboxylic acid anion, an alicyclic hydroxycarboxylic acid anion, an aromatic hydroxycarboxylic acid anion, a carbonyl carboxylic acid anion, an alkyl ether carboxylic acid anion, a halogen carboxylic acid anion and an amino acid anion. (The number of the carbon atoms in the carboxylic acid anions listed below include the number of the carbon atoms in carboxy groups.)

The aforementioned saturated aliphatic carboxylic acid anion is comprised of a linear or branched aliphatic saturated hydrocarbon group and at least one carboxylic acid anion, may contain a carboxy group and a carboxylate group, and preferably has 1 to 22 carbon atoms. Although not particularly limited, specific examples thereof include anions obtained by dissociating protons from, for example, formic acid, acetic acid, propionic acid, butyric acid, valeric acid, caproic acid, enanthic acid, caprylic acid, pelargonic acid, capric acid, lauric acid, myristic acid, pentadecylic acid, palmitic acid, margaric acid, stearic acid, arachidic acid, heneicosylic acid, behenic acid, isobutyric acid, 2-methylbutyric acid, isovaleric acid, 2-ethylhexanoic acid, isononanoic acid, isopalmitic acid, isostearic acid, oxalic acid, malonic acid, succinic acid, glutaric acid, adipic acid, pimelic acid, suberic acid, azelaic acid and sebacic acid.

The aforementioned unsaturated aliphatic carboxylic acid anion is comprised of a linear or branched aliphatic unsaturated hydrocarbon group and at least one carboxylic acid anion, may contain a carboxy group and a carboxylate group, and preferably has 3 to 22 carbon atoms. Although not particularly limited, specific examples thereof include anions obtained by dissociating protons from, for example, acrylic acid, methacrylic acid, crotonic acid, palmitoleic acid, oleic acid, vaccenic acid, linoleic acid, linolenic acid, eleostearic acid, arachidonic acid, maleic acid and fumaric acid.

The aforementioned alicyclic carboxylic acid anion is comprised of a non-aromatic saturated or unsaturated carbon ring and at least one carboxylic acid anion, and preferably has 6 to 20 carbon atoms. Particularly, an alicyclic carboxylic acid anion having a cyclohexane ring skeleton is preferred; although not particularly limited, specific examples thereof include anions obtained by dissociating protons from, for example, cyclohexanecarboxylic acid and cyclohexanedicarboxylic acid.

The aforementioned aromatic carboxylic acid anion is comprised of one or multiple aromatic rings and at least one carboxylic acid anion, and preferably has 6 to 20 carbon atoms. Particularly, an aromatic carboxylic acid anion having a benzene ring skeleton is preferred; although not particularly limited, specific examples thereof include anions obtained by dissociating protons from, for example, benzoic acid, cinnamic acid, phthalic acid, isophthalic acid and terephthalic acid.

The aforementioned saturated aliphatic hydroxycarboxylic acid anion is comprised of a linear or branched aliphatic saturated hydrocarbon group, at least one carboxylic acid anion and at least one hydroxy group, may contain a carboxy group and a carboxylate group, and preferably has 2 to 24 carbon atoms. Particularly, a saturated aliphatic hydroxycarboxylic acid anion having 1 to 4 hydroxy groups and 2 to 7 carbon atoms is preferred. Although not particularly limited, specific examples thereof include anions obtained by dissociating protons from, for example, glycolic acid, lactic acid, tartronic acid, glyceric acid, hydroxyacetic acid, hydroxybutyric acid, 2-hydroxydecanoic acid, 3-hydroxydecanoic acid, 12-hydroxystearic acid, dihydroxystearic acid, cerebronic acid, malic acid, tartaric acid, citramalic acid, citric acid, isocitric acid, leucine acid, mevalonic acid and pantoic acid.

The aforementioned unsaturated aliphatic hydroxycarboxylic acid anion is comprised of a linear or branched aliphatic unsaturated hydrocarbon group, at least one carboxylic acid anion and at least one hydroxy group, and preferably has 3 to 22 carbon atoms. Although not particularly limited, specific examples thereof include anions obtained by dissociating protons from, for example, ricinolic acid, ricinoleic acid and ricineraidic acid.

The aforementioned alicyclic hydroxycarboxylic acid anion is comprised of a non-aromatic saturated or unsaturated carbon ring, at least one carboxylic acid anion and at least one hydroxy group, and preferably has 4 to 20 carbon atoms. Particularly, an alicyclic hydroxycarboxylic acid anion having a six-membered ring skeleton and 1 to 4 hydroxy groups is preferred; although not particularly limited, specific examples thereof include anions obtained by dissociating protons from, for example, hydroxycyclohexanecarboxylic acid, dihydroxycyclohexanecarboxylic acid, quinic acid (1,3,4,5-tetrahydroxycyclohexanecarboxylic acid) and shikimic acid. Further, anions obtained by dissociating protons from hydroxy group-containing cyclic lactones may also be preferably used; specific examples thereof include anions obtained by dissociating protons from, for example, ascorbic acid and erythorbic acid.

The aforementioned aromatic hydroxycarboxylic acid anion is comprised of one or multiple aromatic rings, at least one carboxylic acid anion and at least one hydroxy group, and preferably has 6 to 20 carbon atoms. Particularly, an aromatic carboxylic acid anion having a benzene ring skeleton and 1 to 3 hydroxy groups is preferred; although not particularly limited, specific examples thereof include anions obtained by dissociating protons from, for example, salicylic acid, hydroxybenzoic acid, dihydroxybenzoic acid, trihydroxybenzoic acid, hydroxymethylbenzoic acid, vanillic acid, syringic acid, protocatechuic acid, gentisic acid, orsellinic acid, mandelic acid, benzylic acid, atrolactic acid, phloretic acid, coumaric acid, umbellic acid, caffeic acid, ferulic acid and sinapic acid.

The aforementioned carbonyl carboxylic acid anion is a carboxylic acid anion having a carbonyl group(s) in a molecule and having 3 to 22 carbon atoms; preferred is a carbonyl carboxylic acid anion having 1 to 2 carbonyl groups and 3 to 7 carbon atoms. Particularly, preferred is a carbonyl carboxylic acid anion represented by $CH_3((CH_2)_pCO(CH_2)_q)COO^-$ (where p and q each represent an integer of 0 to 2). Although not particularly limited, specific examples thereof include anions obtained by dissociating protons from, for example, pyruvic acid.

The aforementioned alkyl ether carboxylic acid anion is a carboxylic acid anion having an ether group(s) in a molecule and having 2 to 22 carbon atoms, including a polyoxyalkylene alkyl ether carboxylic acid anion(s); preferred is an alkyl carboxylic acid anion having 1 to 2 ether groups and 2 to 12 carbon atoms. Particularly, preferred is an alkyl ether carboxylic acid anion represented by $CH_3(CH_2)_rO(CH_2)_sCOO$— (where r and s each represent an integer of 0 to 4) and polyoxyethylene alkyl ether carboxylic acid anion. Although not particularly limited, specific examples thereof include anions obtained by dissociating protons from, for example, methoxyacetic acid, ethoxyacetic acid, methoxybutyric acid and ethoxybutyric acid.

As the aforementioned halogen carboxylic acid anion, a halogen carboxylic acid anion having 2 to 22 carbon atoms is preferred. Although not particularly limited, specific examples thereof include anions obtained by dissociating protons from, for example, fluorine-substituted halogen carboxylic acids such as trifluoroacetic acid, trichloroacetic acid, tribromoacetic acid, pentafluoropropionic acid, pentachloropropionic acid, pentabromopropionic acid, perfluorononanoic acid, perchlorononanoic acid and perbromononanoic acid.

Although not particularly limited, examples of the aforementioned amino acid anion include anions obtained by dissociating protons from, for example, glycine, alanine, glutamic acid, arginine, asparagine, aspartic acid, isoleucine, glutamine, histidine, cysteine, leucine, lysine, proline, phenylalanine, threonine, serine, tryptophan, tyrosine, methionine, valine, sarcosine, aminobutyric acid, methylleucine, aminocaprylic acid, aminohexanoic acid, norvaline, aminovaleric acid, aminoisobutyric acid, thyroxine, creatine, ornithine, opine, theanine, tricholomine, kainic acid, domoic acid, ibotenic acid, acromelic acid, cystine, hydroxyproline, phosphoserine and desmosine.

In terms of achieving advantages of the present invention such as water and moisture retention property, stability of the composition, affinity with active ingredients, compatibility (solubility), spreadability thereof when applied to the skin, non-stickiness, a moisture retention feeling, skin compatibility (i.e., affinity between the skin and a hydrogen-bonding functional group(s)), the organic ammonium salt used in the present invention contains a hydrogen-bonding functional group(s) in an anion or a cation; and it is preferred that as a functional group, there be contained a hydrogen-bondable group(s) such as an oxygen-containing group, a nitrogen-containing group, a sulfur-containing group and a phosphorus-containing group. Preferred are a sulfur-based anion, a phosphorus-based anion, a cyan-based anion and a nitrogen oxide-based anion as mentioned above.

In order to achieve an advantage of the present invention which is the stability of the composition containing the organic or inorganic additive, it is preferred that the organic ammonium salt used in the present invention has a hydrogen-bonding functional group(s) in a cation or an anion in view of exhibiting affinity between an additive and a hydrogen-bonding functional group(s) of the organic ammonium salt via hydrogen, coordination or ion bonding. It is preferred that, as a functional group, there be contained a hydrogen-bondable group(s) such as an oxygen-containing group, a nitrogen-containing group, a sulfur-containing group and a phosphorus-containing group. Preferred are a sulfur-based anion, a phosphorus-based anion, a cyan-based anion, a nitrogen oxide-based anion and a carboxylic acid anion as mentioned above.

As a hydrogen-bonding functional group(s) present in an anion, preferred are a hydroxyl group, a carbonyl group, a carboxy group, a carboxylate group, a sulfonyl group, a sulfate ester group, a phosphoric acid group and a phosphoric acid ester group; and among them, more preferred are a hydroxy group, a carboxy group, a carboxylate group, a sulfonyl group and a phosphoric acid group; even more preferred are a hydroxy group, a carboxy group and a carboxylate group. Further, in order to improve the effects of the present invention, it is particularly preferred that the organic ammonium salt used in the present invention be an organic salt having a hydrogen-bonding functional group(s) in both a cation and an anion.

In terms of safety, it is preferred that the organic ammonium salt to be used in the composition of the present invention employ a natural compound in a cation and/or an anion. Although not particularly limited, examples of such cation include a choline cation, acetylcholine cation and carnitine cation; examples of such anion include a citrate anion, a lactic acid anion, malic acid anion, ascorbic acid anion, glycolic acid anion, tartaric acid anion, quinic acid anion, acetate anion, butyric acid anion, caproic acid anion, caprylic acid anion, capric acid anion, succinic acid anion, oleic acid anion, linoleic acid anion, alanine anion and glycine anion; examples of such organic ammonium salt include: choline amino acid salts such as a choline citrate, choline lactate, choline malate, choline ascorbate, choline glycolate, choline tartrate, choline quinate, choline acetate, choline butyrate, choline caproate, choline caprylate, choline caprate, choline succinate, choline oleate, choline linoleate, choline alanine salt and choline glycine salt; acetylcholine amino acid salts such as an acetylcholine citrate, acetylcholine lactate, acetylcholine malate, acetylcholine ascorbate, acetylcholine glycolate, acetylcholine tartrate, acetylcholine quinate, acetylcholine acetate, acetylcholine caproate, acetylcholine caprylate, acetylcholine caprate, acetylcholine succinate, acetylcholine oleate, acetylcholine linoleate, acetylcholine alanine salt and acetylcholine glycine salt; carnitine amino acid salts such as a carnitine citrate, carnitine lactate, carnitine malate, carnitine ascorbate, carnitine glycolate, carnitine tartrate, carnitine quinate, carnitine acetate, carnitine butyrate, carnitine caproate, carnitine caprylate, carnitine caprate, carnitine succinate, carnitine oleate, carnitine linoleate, carnitine alanine salt and carnitine glycine salt. In a case where ascorbic acid (vitamin C) is used in the above-mentioned carboxylic acid anion, since ascorbic acid (vitamin C) plays an important role in synthesizing collagen genes in fibroblast cells or promoting protein synthesis of collagens, an organic ammonium salts having a constituent of ascorbic acid can achieve an advantage of promoting collagen synthesis.

In terms of safety, if the cations have a monohydroxyalkyl(s), preferred are a triethanolammonium cation and diethanolammonium cation, particularly preferred is a triethanolammonium cation.

Further, in terms of safety and usage, it is preferred that the organic ammonium salt used in the present invention employ, as a raw material(s), compounds listed in Japanese standards of quasi-drug ingredients (JSQI), Japanese Pharmacopoeia (JP), Japanese pharmaceutical codex (JPC), Japanese pharmaceutical excipients (JPE) and Japan's specifications and standards for food additives (JSFA). It is more preferred that there be used an organic ammonium salt whose raw material(s) composing the cations and/or anions are those listed in JSQI, JP, JPC, JPE and JSFA; and an organic ammonium salt listed in JSQI. Although not particularly limited, examples of a cation include a monoethanolammonium cation, diethanolammonium cation, triethanolammonium cation, 2-amino-2-hydroxymethyl-1,3-propanediol ammonium cation, 2-amino-2-methyl-1-propanol ammonium cation and 2-amino-2-methyl-1,3-propanediol ammonium cation; examples of an anion include an acetate anion, caprylic acid anion, capric acid anion, lauric acid anion, myristic acid anion, palmitic acid anion, stearic acid anion, oleic acid anion, linoleic acid anion, lactic acid anion, glycolic acid anion, succinic acid anion, citrate anion, chloride anion, fumaric acid anion, phosphoric acid anion and ascorbic acid anion.

From the perspective of exhibiting the advantages of the present invention, it is particularly preferred that the organic ammonium salt used in the present invention be an organic salt having a hydrogen-bonding functional group(s) in both a cation and an anion.

The composition of the present invention can be used for applications requiring the non-volatile, water-retaining/moisturizing and antistatic effects that are attributed to the organic ammonium salt used in the present invention. Since the organic ammonium salt itself is non-volatile, it stays in the applied region as a liquid to evenly coat it such that the effects of the organic ammonium salt or an additive(s) dissolved in the organic ammonium salt can be exhibited in a more effective manner and for a long period of time. Such applications include, although not particularly limited to, cosmetics, pharmaceuticals, quasi-pharmaceutical products, paints, lubricants, adhesives, inks, emulsion fuels, liquid oral compositions, foam sheets (polyurethane foam, etc.), surface inspection brighteners, detergents, heat storage agents, cooling sheets, fiber treatment agents and paper treatment agents.

The composition of the present invention contains an organic ammonium salt having a salt structure, and therefore may provide an antistatic effect in any field of application. The composition thus enables prevention of static charge (static protection). Further, the antistatic effect improves when used in liquid because it is evenly (uniformly) coated in the applied region, and the melting point (freezing point) of the organic ammonium salt is preferably lower than 25° C., more preferably lower than −5° C., particularly preferably lower than −10° C. Accordingly, it may provide an advantage of preventing an electrical shock to be brought about in association with a discharging current when static discharging occurs form an electrically charged human body to a grounding conductor or from a grounding conductor to an electrically charged human body, or preventing dust from being deposited by static electricity onto human body or clothes, or provide an advantage of providing cohesiveness of the hair. Further, it may also be utilized for an anti-static purpose when used in, for example, an adhesive or a paint for, e.g., resin or metal to thereby prevent electrostatic discharging or adhesion of dust. The antistatic effect of the composition, therefore, reduces these risks.

As for the composition of the present invention, the organic ammonium salt may be in an anhydrous state (anhydride) or a hydrate that has absorbed the water in the air. A hydrate refers to a compound that has absorbed water to reach a saturated state in moisture rate after being left in the air at 25° C. A compound that does not absorb water when left in the air at 25° C. is not a hydrate, but an anhydride.

When the organic ammonium salt used in the present invention is a hydrate, the water content in the hydrate will be suppressed from evaporating such that the water and moisture retention effect shall last for a long period of time. Thus, after dissolving water of an excess amount against a hydration water in the organic ammonium salt used in the present invention and then leaving the same in the air so as to observe a decrease in water, since the hydration water is suppressed from being evaporated, a rate of decrease in water content shall decrease with time.

The organic ammonium salt used in the present invention may be either a liquid or a solid at 25° C., but it is preferable in terms of exhibiting the advantage of the present invention that an anhydride and hydrate thereof are liquid at 25° C. The organic ammonium salt is useful if it is liquid at 25° C., because after applying the composition onto the skin, the composition retains a high water content as a hydrate and keeps its moisture without forming any precipitation after a certain amount of water is evaporated, and keeps its dissolved state without forming any precipitation of active ingredients. Also, the effects of an additive(s) dissolved therein can be exhibited immediately after the use of the agent in a more effective manner and for a long period of time, due to the fact that even after other solvents mixed therein and water have volatilized, the agent can still be evenly applied to and thus coat the coating area as a liquid, since the organic ammonium salt itself is non-volatile.

Further, when used with other additive(s) (e.g. poorly-soluble active ingredients), the organic ammonium salt can be used as a base agent, solvent and a carrier toward the inner portion of the skin. The melting point (freezing point) of the organic ammonium salt used in the present invention is preferably lower than 25° C., more preferably lower than −5° C., particularly preferably lower than −10° C.

(Surfactant Agent)

The surfactant agent contained in the composition of the present invention is not particularly limited, and any general surfactant may be utilized. The surfactant agent may be appropriately selected from a nonionic surfactant, an anionic surfactant, a cationic surfactant, an amphoteric surfactant and a silicone-based surfactant among which a nonionic surfactant and an anionic surfactant are preferable, and particularly in the case of water-in-oil type (W/O type) emulsification composition, a nonionic surfactant is preferred. Any one of them may be used alone, or two or more of them may be used in combination.

Although not particularly limited, examples of the non-ionic surfactant include polyglycerin fatty acid esters, polyoxyethylene sorbitan fatty acid esters, polyoxyethylene sorbitol fatty acid esters, polyoxyethylene lanolin/lanolin alcohol/beeswax derivatives, polyoxyethylene castor oil/hardened castor oil, polyoxyethylene sterols/hydrogenated sterols, polyoxyethylene alkyl ethers, polyoxyethylene polyoxypropylene alkyl ethers, polyethylene glycol fatty acid ester, polyoxyethylene glyceryl isostearates, sorbitan fatty acid esters, glycerin fatty acid esters, diglycerine fatty acid esters and polyglyceryl fatty acid esters.

Although not particularly limited, examples of the polyglyceryl fatty acid esters include hexaglyceryl monolaurate (HLB 14.5), hexaglyceryl monomyristinate (HLB 11), hexaglyceryl monostearate (HLB 9.0), hexaglyceryl monooleate (HLB 9.0), decaglyceryl monolaurate (HLB 15.5), decaglyceryl monomyristinate (HLB 14.0), decaglyceryl monostearate (HLB 12.0), decaglyceryl monoisostearate (HLB 12.0), decaglyceryl monooleate (HLB 12.0), decaglyceryl distearate (HLB 9.5), decaglyceryl diisostearate (HLB 10.0), decaglyceryl pentaisostearate (HLB 3.5) and decaglyceryl pentaoleate (HLB 3.5).

Examples of the polyoxyethylene sorbitan fatty acid esters include polyoxyethylene glycerin fatty acid esters such as a polyoxyethylene (referred to as POE hereafter) (5) glyceryl monostearate (HLB 9.5), POE (15) glyceryl monostearate (HLB 13.5), POE (5) glyceryl monooleate (HLB 9.5) and POE (15) glyceryl monooleate (HLB 14.5); POE (20) sorbitan monococoate ester (HLB 16.9), POE (20) sorbitan monopalmitate (HLB 15.6), POE (20) sorbitan monostearate (HLB 14.9), POE (6) sorbitan monostearate (HLB 9.5), POE (20) sorbitan tristearate (HLB 10.5), POE (20) sorbitan monoisostearate (HLB 15.0), POE (20) sorbitan monooleate (HLB 15.0), POE (6) sorbitan monooleate (HLB 10.0) and POE (20) sorbitan trioleate (HLB 11.0).

Examples of the polyoxyethylene sorbitol fatty acid esters include POE (6) sorbitan monolaurate (HLB 15.5), POE (60) sorbitan tetrastearate (HLB 13.0), POE (30) sorbitan tetraoleate (HLB 11.5), POE (40) sorbitan tetraoleate (HLB 12.5), POE (60) sorbitan tetraoleate (HLB 14.0), POE (6) sorbitan tetraoleate (HLB 8.5) and POE (6) sorbitan hexastearate (HLB 3.0).

Examples of the polyoxyethylene lanolin/lanolin alcohol/beeswax derivatives include POE (10) lanolin (HLB 12.0), POE (20) lanolin (HLB 13.0), POE (30) lanolin (HLB 15.0), POE (5) lanolin alcohol (HLB 12.5), POE (10) lanolin alcohol (HLB 15.5), POE (20) lanolin alcohol (HLB 16.0), POE (40) lanolin alcohol (HLB 17.0), POE (20) sorbitol beeswax (HLB 9.5) and POE (6) sorbitol beeswax (HLB 7.5).

Examples of the polyoxyalkylene castor oils/hardened caster oils include POE (20) caster oil (HLB 10.5), POE (40) caster oil (HLB 12.5), POE (50) caster oil (HLB 14.0), POE (60) caster oil (HLB 14.0), POE (20) hardened caster oil (HLB 10.5), POE (30) hardened caster oil (HLB 11.0), POE (40) hardened caster oil (HLB 13.5), POE (60) hardened caster oil (HLB 14.0), POE (80) hardened caster oil (HLB 16.5), POE (40) hardened caster oil, POE (100) hardened caster oil (HLB 16.5) and POE (3) caster oil (HLB 3.0).

Examples of the polyoxyethylene sterols/hydrogenated sterols include POE (5) phytosterol (HLB 9.5), POE (10) phytosterol (HLB 12.5), POE (20) phytosterol (HLB 15.5), POE (30) phytosterol (HLB 18.0), POE (25) phytostanol (HLB 14.5) and POE (30) cholestanol (HLB 17.0).

Examples of the polyoxyethylene alkyl ethers include POE (2) lauryl ether (HLB 9.5), POE (4.2) lauryl ether (HLB 11.5), POE (9) lauryl ether (HLB 14.5), POE (5.5) cetyl ether (HLB 10.5), POE (7) cetyl ether (HLB 11.5), POE (10) cetyl ether (HLB 13.5), POE (15) cetyl ether (HLB 15.5), POE (20) cetyl ether (HLB 17.0), POE (23) cetyl ether (HLB 18.0), POE (4) stearyl ether (HLB 9.0), POE (20) stearyl ether (HLB 18.0), POE (7) oleyl ether (HLB 10.5), POE (10) oleyl ether (HLB 14.5), POE (15) oleyl ether (HLB 16.0), POE (20) oleyl ether (HLB 17.0), POE (50) oleyl ether (HLB 18.0), POE (10) behenyl ether (HLB 10.0), POE (20) behenyl ether (HLB 16.5), POE (30) behenyl ether (HLB 18.0), POE (2) (C12-15) alkyl ether (HLB 9.0), POE (4) (C12-15) alkyl ether (HLB 10.5), POE (10) (C12-15) alkyl ether (HLB 15.5), POE (5) secondary alkyl ether (HLB 10.5), POE (7) secondary alkyl ether (HLB 12.0), POE (9) alkyl ether (HLB 13.5), POE (12) alkyl ether (HLB 14.5) and POE (2) stearyl ether (HLB 4.0)

Examples of the polyoxyethylene polyoxypropylene alkyl ethers include polyoxyethylene (hereunder referred to as "POE") (1) polyoxypropylene (hereunder referred to as "POP") (4) cetyl ether (HLB 9.5), POE (10) POP (4) cetyl ether (HLB 10.5), POE (20) POP (8) cetyl ether (HLB 12.5), POE (20) POP (6) decyltetradecyl ether (HLB 11.0) and POE (30) POP (6) decyltetradecyl ether (HLB 12.0).

Examples of the polyethylene/propylene glycol fatty acid esters include polyethylene glycol (hereunder referred to as "PEG") (10) monolaurate (HLB 12.5), PEG (10) monostearate (HLB 11.0), PEG (25) monostearate (HLB 15.0), PEG (40) monostearate (HLB 17.5), PEG (45) monostearate (HLB 18.0), PEG (55) monostearate (HLB 18.0), PEG (10) monostearate (HLB 11.0), PEG distearate (HLB 16.5), PEG diisostearate (HLB 9.5), PEG (2) monostearate (HLB 4.0), PEG (2) stearate (HLB 4.5), ethylene glycol monostearate (HLB 3.5) and self-emulsification type propylene glycol monostearate (HLB 4.0).

Examples of the polyoxyethylene glyceryl isostearates include PEG (8) glyceryl isostearate (HLB 10.0), PEG (10) glyceryl isostearate (HLB 10.0), PEG (15) glyceryl isostearate (HLB 12.0), PEG (20) glyceryl isostearate (HLB 13.0), PEG (25) glyceryl isostearate (HLB 14.0), PEG (30) glyceryl isostearate (HLB 15.0), PEG (40) glyceryl isostearate (HLB 15.0), PEG (50) glyceryl isostearate (HLB 16.0) and PEG (60) glyceryl isostearate (HLB 16.0).

Examples of the sorbitan fatty acid esters include sorbitan tristearate (HLB 2.0), sorbitan sesquiisostearate (HLB 4.5), sorbitan monostearate (HLB 4.7), sorbitan monoisostearate (HLB 5.0) and sorbitan monooleate (HLB 4.3).

Examples of the glycerin fatty acid esters include glyceryl myristate (HLB 3.5), glyceryl monostearate (HLB 4.0), glyceryl monoleate (HLB 2.5), hexaglyceryl tristearate (HLB 2.5), self-emulsification type glyceryl monostearate (HLB 4.0), glyceryl monoisostearate (HLB 4.0) and decaglyceryl pentastearate (HLB 3.5).

Examples of the diglycerine fatty acid esters include diglyceryl monooleate (HLB 5.5).

Other examples include polyoxyethylene fatty acid ester, polyoxyethylene hardened caster oil, polyoxyethylene caster oil, polyoxyethylene hardened castor oil fatty acid ester, castor oil fatty acid ester, hardened castor oil fatty acid ester, ethylene glycol fatty acid ester, sucrose fatty acid ester, organic acid monoglyceride, polyethyleneglycol monoethanol fatty acid amide, polyoxyethylene lanolin alcohol ether, polyoxyethylene alkyl ether, lauric acid alkanolamide, polyoxyethylene glycerin fatty acid ester, polyoxyethylene hardened castor oil pyroglutamic acid fatty diester, pyroglutamic acid fatty glyceryl, polyoxyethylene glyceryl pyroglutamic acid fatty diester and polyether modified silicone In the case of a water-in-oil type (W/O type) emulsification composition or a composition with which the organic ammonium salt used in the present invention is homogeneously mixed is to be made, HLB values of the above-mentioned nonionic surfactants are preferably 1 to 16, more preferably 1 to 10, even more preferably 3 to 7, still more preferably 5 to 7. Specifically, preferred are sorbitan tristearate (HLB 2.0), decaglyceryl pentaisostearate (HLB 3.5), sorbitan sesquiisostearate (HLB 4.5), diglyceryl monooleate (HLB 5.5), POE (6) sorbitol beeswax (HLB 7.5) and POE (6) sorbitan tetraoleate (HLB 8.5), more preferred are decaglyceryl pentaisostearate (HLB 3.5), sorbitan sesquiisostearate (HLB 4.5), and diglyceryl monooleate (HLB 5.5) and particularly preferred is diglyceryl monooleate (HLB 5.5).

In the case of an oil-in-water type (O/W type) emulsification composition, HLB values of the above-mentioned nonionic surfactants are preferably 3 to 20.

Although not particularly limited, examples of the anionic surfactant include an alkyl benzene sulfonate, alkylnaphthalenesulfonate, alkylsulfonate salt, α-olefin sulfonate, alkyl sulfate, alkylsulfate ester salt, alkyl ether phosphate, N-acyl amino acid salt, alkyl aryl sulfonate, alkyl ether sulfate, alkylamide sulfate, alkyl phosphate, alkylphosphonic acid or its salts, alkylamide phosphate, alkyloylalkyltaurine salt, fatty acid salt, polyoxyethylene alkyl ether acetate, sodium coconut fatty acid methyltaurate, polyoxyethylenealkyl ether sulfate, phosphate ester salt, polyoxyethylene alkyl ether phosphate, dialkyl sulfosuccinate, perfluoroalkylphosphoric acid ester, N-acyl-L-glutamate and N-acyl-L-arginine ethyl-DL-pyrrolidone carboxylate. Specific examples thereof include sodium deoxycholate, sodium lauryl sulfate, sodium laureth sulfate, sodium myristyl sulfate, sodium cetyl sulfate, sodium oleyl sulfate, sodium dodecylbenzenesulfonate, sodium 1,2-dihydroxypropanesulfonate, sodium polyoxyethylene laurylether acetate and sodium coconut oil fatty acid N-acylglutamate.

Although not particularly limited, examples of the cationic surfactant include, a mono-alkyl trimethyl ammonium salt, dialkyl dimethyl ammonium salt, alkylpyridinium salt, N,N-dialkyloyloxyethyl-N-methyl, N-hydroxyethyl ammonium salt, alkylamine salt, and stearyldimethylbenzylammonium salt.

Although not particularly limited, examples of the amphoteric surfactant include an alkylbetaine, fatty acid amide propyl betaine, lauryl hydroxysulfobetaine, 2-alkyl-N-carboxymethyl-N-hydroxyethylimidazolinium betaine, lecitin, hydrogenated lecitin, alkyloxyhydroxypropyl arginine hydrochloride, lauryl hydroxysultaine, lauriminodipropionate, undecyl hydroxyethyl imidazolinium betaine sodium, disodium lauriminodiacetate, lauryl dimethyl amino acetic acid betaine, N-[3-alkyloxy-2-hydroxypropyl]-L-arginine hydrochloride, alkyl hydroxy sulfobetaine, alkyldimethy amine oxide, sodium alkylamino dipropionate, dihydroxyalkyl methylglycine, and sodium lauryl diaminoethylglycinate.

Although not particularly limited, examples of the silicone-based surfactant include PEG-10 dimethicone, PEG/PPG-20/20 dimethicone, polysilicone-13 and lauryl polyglyceryl-3 polydimethylsiloxyethyl dimethicone.

(Composition)

There are no particular restrictions on the form of the composition of the present invention as long as components thereof are not separated; the composition is preferably a uniform composition or an emulsification composition, which may, for example, be a liquid composition, a gel composition, a water-in-oil type (W/O type) emulsification composition, an oil-in-water type (O/W type) emulsification composition and a composite type emulsion (W/O/W type, O/W/O type).

In the case where the composition of the present invention contains an organic ammonium salt and a surfactant, there may be used an organic ammonium salt having a hydrogen-bonding functional group(s) in a cation and/or an anion to thereby provide a composition that has excellent affinity with the surfactant to provide uniformity. The organic ammonium salt may be either liquid or solid at 25° C.; nevertheless, in terms of obtaining a composition that does not form any precipitation, the melting point (freezing point) of the organic ammonium salt to be used in the present invention is preferably lower than 25° C., more preferably lower than –5° C., particularly preferably lower than –10° C. The composition of the present invention contains the above-mentioned organic ammonium salt, thus being excellent in water and moisture retention property, antistatic property and active ingredient solubility. In order to allow the composition to remain in a particular region to which it has been applied, and the effects of the organic ammonium salt used in the present invention to be expressed in such region, the composition may be of an immobile gel.

The surfactant to be combined with the organic ammonium salt may be suitably selected for obtaining a gel composition, and non-ionic and anionic surfactants may be used, and a non-ionic surfactant is preferable; although not particularly limited, as a non-ionic surfactant, for example, a polyglycerol fatty acid ester, sorbitan fatty acid ester and polyoxyethylene sorbitan fatty acid ester may be used, and a polyglycerol fatty acid ester is preferable. As an anionic surfactant, sodium deoxycholate may be used.

It is preferred that the organic ammonium salt be contained in the composition of the organic ammonium salt and the surfactant by an amount of, although not particularly limited to, not smaller than 0.1% by mass, not smaller than 1% by mass, or not smaller than 10% by mass for exhibiting water and moisture retention property; and it is preferably not smaller than 50% by mass, more preferably not smaller than 60% by mass, even more preferably not smaller than 90% by mass for obtaining a gel composition.

(Oil-Containing Composition)

In the present invention, there may be used the above-mentioned organic ammonium salts and surfactants for the composition containing the organic ammonium salt, the surfactant and the oil agent. Although not particularly limited, examples of the oil agents include hydrocarbons, lipids, esters, fatty acids, higher alcohols, silicone oils, waxes, steroids, monomers, oligomers, fluid polymers (polymer compounds), silicone oils, alcohols, glycols, glycol ethers and cellosolves; these oil agents may be liquids, gels or solids at room temperature. Any one of them may be used alone, or two or more of them may be used in combination.

Although not particularly limited, examples of the hydrocarbons include mineral oils such as a liquid paraffin, paraffin, solid paraffin, light isoparaffin, light liquid isoparaffin, liquid isoparaffin, ceresin, microcrystalline wax, petroleum jelly, white petrolatum and mineral oil; and synthetic oils such as squalane, alkylbenzene, polyethylene wax, polypropylene wax, hydrogenated polyisobutene, ethylene-α-olefin-cooligomer and ethylene propylene polymer.

As other synthetic oils, there may be listed, as aromatic oils, alkylbenzenes such as monoalkylbenzene and dialkylbenzene, or monoalkylnaphthalene, dialkylnaphthalene and polyalkylnaphthalene; and, as aliphatic oils, a normal paraffin, isoparaffin, polybutene, polyisobutylene, polyalphaolefin (e.g. 1-octene oligomer, 1-decene oligomer and ethylene-propylene oligomer) and its hydride, and a cooligomer of alphaolefin and ethylene. There may also be listed, as ester-based oils, diester oils such as dibutyl sebacate, di-2-ethylhexyl sebacate, dioctyl adipate, diisodecyl adipate, ditridecyl adipate, ditridecyl glutarate and methyl-acetylsinolate; or aromatic ester oils such as trioctyl trimellitate, tridecyl trimellitate and tetraoctyl pyromellitate; or even polyol ester oils such as trimethylolpropane caprylate, trimethylolpropane pelargonate, pentaerythritol-2-ethylhexanoate and pentaerythritol pelargonate; or yet a complex ester oil as an oligoester of a multivalent alcohol and a mixed fatty acid of dibasic acid-monobasic acid. Although not particularly limited, there may be listed, as ether-based oils, phenyl ether oils such as monoalkyltriphenyl ether, alkyldiphenyl ether, dialkyldiphenyl ether, pentaphenyl ether, tetraphenyl ether, monoalkyl tetraphenyl ether and dialkyl tetraphenyl ether.

Although not particularly limited, examples of the lipids include an avocado oil, almond oil, flaxseed oil, olive oil, cacao oil, perilla oil, camellia oil, castor oil, sesame oil, wheat germ oil, rice germ oil, rice bran oil, sasanqua oil, safflower oil, soybean oil, evening primrose oil, camellia oil, corn oil, rapeseed oil, persic oil, palm kernel oil, coconut oil, palm oil, beef fat, pork fat, horse fat, sheep fat, shea fat, cacao fat, turtle oil, mink oil, egg yolk oil, purcellin oil, castor oil, jojoba oil, grape seed oil, macadamia nut oil, cotton seed oil, meadowfoam oil, coconut oil, peanut oil, cod liver oil, rose hip oil, hardened oil of beef fat, extremely hardened oil of beef fat, hardened castor oil and extremely hardened palm oil.

Although not particularly limited, examples of the esters include a stearic acid alkyl ester, palmitic acid alkyl ester, myristic acid alkyl ester, lauric acid alkyl ester, behenic acid alkyl ester, oleic acid alkyl ester, isostearic acid alkyl ester, 12-hydroxystearic acid alkyl ester, undecylenic acid alkyl ester, lanolin fatty acid alkyl ester, erucic acid alkyl ester, coconut oil fatty acid alkyl ester, stearoyloxystearic acid alkyl ester, isononanoic acid alkyl ester, dimethyloctanoic acid alkyl ester, octanoic acid alkyl ester, lactic acid alkyl ester, ethylhexanoic acid alkyl ester, neopentanoic acid alkyl ester, malic acid alkyl ester, phthalic acid alkyl ester, citric acid alkyl ester, malonic acid alkyl ester, adipic acid alkyl ester, ethylene glycol fatty acid ester, propanediol fatty acid ester, butanediol fatty acid ester, trimethylolpropane fatty acid ester, pentaerythritol fatty acid ester, polyglycerin fatty acid ester, trehalose fatty acid ester, pentylene glycol fatty acid ester and trimellitic acid tris(2-ethylhexyl).

Although not particularly limited, examples of the fatty acids include stearic acid, palmitic acid, myristic acid, lauric acid, behenic acid, oleic acid, isostearic acid, 12-hydroxystearic acid, undecylenic acid, lanolin fatty acid, erucic acid and stearoyloxystearic acid.

Although not particularly limited, examples of the higher alcohols include a lauryl alcohol, cetyl alcohol, cetostearyl alcohol, stearyl alcohol, oleyl alcohol, behenyl alcohol, lanolin alcohol, hexyldecanol, myristyl alcohol, aralkyl alcohol, phytosterol, isostearyl alcohol and octyldodecanol.

Although not particularly limited, examples of the silicone oils include an amino-modified silicone oil, epoxy-modified silicone oil, carboxyl-modified silicone oil, polyether-modified oil, polyglycerin-modified silicone oil, dimethylpolysiloxane, dimethylsilicone, polyether-modified silicone, methylphenylsilicone, alkyl-modified silicone, higher fatty acid-modified silicone, methylhydrogen silicone, fluorine-modified silicone, epoxy-modified silicone, carboxy-modified silicone, carbinol-modified silicone, amino-modified silicone, methylpolysiloxane, methylphenylpolysiloxane, silicone resin, dimethicone, methylhydrogenpolysiloxane, methylcyclopolysiloxane, octamethyltrisiloxane, tetramethylhexasiloxane and highly polymerized methylpolysiloxane.

Although not particularly limited, examples of the waxes include a Japan wax, beeswax, sumac wax, lacquer wax, sugarcane wax, palm wax, montan wax, carnauba wax, candelilla wax, rice bran wax, lanolin, spermaceti, reduced lanolin, liquid lanolin, hard lanolin, ceresin and ozokerite.

Although not particularly limited, examples of the steroids include a cholesterol, dihydrocholesterol and cholesterol fatty acid ester.

When used in the form of gel, hydrocarbons are preferred among these oil agents, and mineral oils and synthetic oils are more preferred.

Although not particularly limited, examples of the monomers include a (meth)acrylate-based monomer, styrene-based monomer, acrylamide-based monomer, olefin-based monomer and vinyl-based monomer.

Examples of the (meth)acrylate-based monomer include, but are not particularly limited to, methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth)acrylate, pentyl (meth)acrylate, amyl (meth)acrylate, isoamyl (meth) acrylate, n-hexyl (meth)acrylate, 2-ethylhexyl (meth)acrylate, heptyl (meth)acrylate, octyl (meth)acrylate, decyl (meth)acrylate, dodecyl (meth)acrylate, pentadecyl (meth) acrylate, hexadecyl (meth)acrylate, heptadecyl (meth)acrylate, octadecyl (meth)acrylate, cyclopropyl (meth)acrylate, cyclobutyl (meth)acrylate, cyclopentyl (meth)acrylate, cyclohexyl (meth)acrylate, isobornyl(meth)acrylate, phenyl (meth)acrylate, o-tolyl (meth)acrylate, m-tolyl (meth)acrylate, p-tolyl (meth)acrylate, 2,3-xylyl (meth)acrylate, 2,4-xylyl (meth)acrylate, 2,5-xylyl (meth)acrylate, 2,6-xylyl (meth)acrylate, 3,4-xylyl (meth)acrylate, 3,5-xylyl (meth) acrylate, 1-naphthyl (meth)acrylate, 2-naphthyl (meth)acrylate, binapthyl (meth)acrylate, anthryl methacrylate, benzyl (meth)acrylate, phenoxyethyl (meth)acrylate, 2-hydroxyethyl (meth)acrylate, 3-hydroxypropyl (meth)acrylate, 2,3-dihydroxypropyl (meth)acrylate, 4-hydroxybutyl (meth) acrylate, 6-hydroxyhexyl (meth)acrylate, 2-methoxyethyl (meth)acrylate, glycidyl (meth)acrylate, methylglycidyl (meth)acrylate, 2-hydroxyethyl acryloyl phosphate, 2-methacryloyloxyethyl isocyanate, aminoethyl (meth)acrylate, dimethylaminoethyl (meth)acrylate, t-butylaminoethyl (meth)acrylate, cyclohexyl maleimide and isopropyl maleimide.

Examples of the styrene-based monomer include, but are not particularly limited to, alkyl styrenes such as styrene, α-methylstyrene, methylstyrene, dimethylstyrene, trimethylstyrene, ethylstyrene, diethylstyrene, triethylstyrene, propylstyrene, isopropylstyrene, butylstyrene, isobutylstyrene, t-butylstyrene, s-butylstyrene, pentylstyrene, hexylstyrene, heptylstyrene and octylstyrene; halogenated styrenes such as chlorostyrene, fluorostyrene, bromostyrene, dibromostyrene and iodine styrene; alkoxystyrenes such as p-methoxystyrene; arylstyrenes such as p-phenylstyrene; styrenesulfonic acid or an alkali metal salt thereof; nitrostyrene; aminostyrene; hydroxystyrene; and 4(trimethoxysilyl)styrene.

Examples of the acrylamide-based monomer include, but are not particularly limited to, (meth)acrylamide, N,N-dimethylacrylamide, (meth)N,N-diethylacrylamide, (meth)N,N-dipropylacrylamide, (meth)N,N-diisopropylacrylamide, (meth)acryloylmorpholine, diacetone (meth)acrylamide, N-hydroxymethyl (meth)acrylamide, N,N-bishydroxymethyl (meth)acrylamide, N-hydroxyethyl(meth)acrylamide, N,N-bishydroxymethyl(meth)acrylamide, N-hydroxypropyl (meth)acrylamide, N,N-bishydroxypropyl (meth)acrylamide, N-hydroxybutyl (meth)acrylamide and N,N-bishydroxybutyl (meth)acrylamide.

Examples of the olefin-based monomer include, but are not particularly limited to, ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 4-methyl-1-butene, 3-methyl-1-pentene, 4-methyl-1-pentene, 3-methyl-1-hexene, 4-methyl-1-hexene, 5-methyl-1-hexene, 3,3-dimethyl-1-pentene, 3,4-dimethyl-1-pentene, 4,4-dimethyl-1-pentene, vinylcyclohexane, hexafluoropropene, tetrafluoroethylene, 2-fluoropropene, fluoroethylene, 1,1-difluoroethylene, 3-fluoropropene, trifluoroethylene, 3,4-dichloro-1-butene, butadiene, hexadiene, isoprene, dicyclopentadiene, norbornene and acetylene.

Examples of the vinyl-based monomer include, but are not particularly limited to, vinyl acetate, vinyl propionate, vinyl alcohol, allyl alcohol, (meth)acrylonitrile, methacrylonitrile, N-vinylpyrrolidone, vinyl chloride, vinyl bromide, vinyl iodide, vinylidene chloride, vinylidene bromide, vinylidene iodide, vinyl sulfonic acid and salts thereof, methallyl sulfonic acid and salts thereof, 2-acrylamide-2-methyl sulfonic acid and salts thereof, N-vinyl-2-pyrrolidone, (meth)acryloylmorpholine, N-vinylpiperidone, N-vinylpiperazine, N-vinylpyrrole and N-vinylimidazole.

Examples of the oligomers include, but are not particularly limited to, low-molecular weight polymers employing the above-listed monomers.

Examples of the fluid polymers (polymer compounds) include, but are not particularly limited to, liquid or sticky liquid polymers employing the above-listed monomers.

Although these may be used at room temperature, they may also be heated if they are highly viscous at room temperature and have problems in maneuverability when processing or forming the same.

Examples of the polymer solution include those in which polymers such as a thermoplastic or thermo-setting resin are dissolved or dispersed into the above-listed oils or solvents.

Although not particularly limited, examples of the silicone oils include, for example, a dimethylsilicone oil, methylphenylsilicone oil (phenyl-modified silicone oil), methylhydrogen silicone oil, polyether-modified silicone oil, aralkyl-modified silicone oil, fluoroalkyl-modified silicone oil, alkyl-modified silicone oil and fatty acid ester modified silicone oil.

Alcohols, glycols, glycol ethers and cellosolves may also be listed. Examples of these specifically include, but are not particularly limited to, alcohols such as methanol, ethanol, 1-propanol, 2-propanol, t-butanol, benzyl alcohol, phenoxyethanol and glycerin; glycols such as ethylene glycol, diethylene glycol, propylene glycol, dipropylene glycol, tripropylene glycol and polypropylene glycol; glycol ethers such as ethylene glycol monomethyl ether, ethylene glycol monoethyl ether, ethylene glycol monobutyl ether, ethylene glycol dimethyl ether, ethylene glycol monophenyl ether, ethylene glycol monobenzyl ether, ethylene glycol monoisopropyl ether, ethylene glycol monoisobutyl ether, diethylene glycol monoethyl ether, diethylene glycol monobutyl ether, diethylene glycol monophenyl ether, diethylene glycol dimethyl ether, triethylene glycol monobutyl ether, propylene glycol monomethyl ether, propylene glycol monoethyl ether, propylene glycol monobutyl ether, propylene glycol monophenyl ether, propylene glycol monopropyl ether, tripropylene glycol monomethyl ether and tripropylene glycol monobutyl ether; and cellosolves such as ethylene glycol monomethyl ether acetate and phenylcellosolve.

If it the composition of the present invention is used as a lubricant, examples thereof include, but are not particularly limited to, a mineral or a synthesis oil or a silicone oil used in a normal grease composition. Examples of the synthesis oil include, but are not particularly limited to, a hydrocarbon-based synthesis oil, an ester-based oil and an ether-based oil; and if it is used as an ink, examples of it include, for example, alcohols, glycols, glycol ethers, and cellosolves; if it is used as a paint, examples of it include, but are not particularly limited to, the above-listed monomers, oligomers and mobile polymers (polymer compound); and if it is used as a lubricant, examples of it include, but are not particularly limited to, hydrocarbons or silicone oils used in a normal grease composition.

The organic ammonium used in the present invention salt has a hydrogen-bonding functional group(s) in a cation and/or an anion to thereby provide a composition that is uniform and has excellent affinity with a surfactant and an oil agent.

As for the composition of the present invention that contains an oil agent(s), there is no limitation on the amount of the organic ammonium salt contained therein; the organic ammonium salt may be contained by a ratio of not smaller than 0.1% by mass, not smaller than 1% by mass, not smaller than 10% by mass, or not smaller than 30% by mass.
(Emulsification Composition)

The emulsification composition in the present invention is not particularly limited but may, for example, be a water-in-oil type (W/O type) emulsification composition, an oil-in-water (O/W type) emulsification composition, and a composite type emulsion (W/O/W type, O/W/O type)

As for the organic ammonium salt, the surfactant and the oil agent to be used in the emulsification composition, those listed in the above may be used.

As for the emulsification composition of the present invention, the mass ratio between the oil agent and water may be, although not particularly limited, from 0.01:99.99 to 99.99:0.01.

In terms of stability of the emulsification composition, preferred embodiments of the organic ammonium salt are those having a hydrogen-bonding functional group(s) in a cation, those in which the anion is a carboxylic acid-based anion, and/or those having a branched hydroxyalkyl group(s) in a cation wherein the terminals are all hydroxy groups.

As for the water-in-oil type (W/O type) emulsification composition of the present invention, the oils are not particularly limited, and the above-listed oil agents may be used. In terms of stability of the emulsification composition, the oil agent may preferably be waxes or hydrocarbons among which a liquid paraffin and a white petrolatum in a mineral oil may be used more preferably.

As for the water-in-oil type (W/O type) emulsification composition of the present invention, although the surfactant agent is not particularly limited, a non-ionic surfactant may preferably be used therefor in terms of stability of the emulsification composition, and the HLB value of such non-ionic surfactant is preferably 1 to 10, more preferably 3 to 7, and even more preferably 5 to 7.

Also, in terms of water and moisture retention property of the water-in-oil type (W/O type) emulsification composition of the present invention, the organic ammonium salt having a hydrogen-bonding functional group(s) in a cation and/or an anion has an advantageous effect, and it is preferred that the organic ammonium salt be an organic salt having a hydrogen-bonding functional group(s) in both a cation and an anion, and it is more preferred that the organic ammonium salt be an organic salt having two or more hydroxyl groups in a cation.

In terms of feeling of use, such as spreadability, non-stickiness, moisture retention feeling, and skin compatibility of the water-in-oil type (W/O type) emulsification composition of the present invention, it is preferred that the melting point (freezing point) of the organic ammonium be lower than 25° C., more preferably lower than −5° C., particularly preferably lower than −10° C.

The composition of the present invention (a composition containing the organic ammonium salt and surfactant, or a composition containing the organic ammonium salt, surfactant and oil agent) or the emulsification composition of the present invention may be used for applications requiring non-volatility, stability of the composition, affinity with active ingredients, compatibility (solubility), water-retaining/moisturizing capacity and antistatic effects that are attributed to the organic ammonium salt used in the present invention, examples of which include, although not particularly limited to, cosmetics, pharmaceuticals, quasi-pharmaceutical products, paints, lubricants, adhesives, inks, emulsion fuels, liquid oral compositions, foam sheets (polyurethane foam, etc.), surface inspection brighteners, detergents, heat storage agents, cooling sheets, fiber treatment agents and paper treatment agents.

The emulsification composition of the present invention may be suitably used for cosmetics, pharmaceuticals, and quasi-pharmaceutical products when, for example, the emulsification composition is particularly of water-in-oil type (W/O type) in terms of advantages in spreadability thereof when applied to the skin, non-stickiness, a moisture retention feeling, skin affinity (i.e., affinity between the skin and a hydrogen-bonding functional group(s)) and/or in terms of improvement in additive amount of the active ingredients. Preferred is an emulsification composition of water-in-oil type in which a continuous phase is composed of oil, and a disperse phase is composed of water, in terms of its advantage of, for example, preventing the applied emulsion from being washed away by sweat or rain to help makeup last longer, preventing water evaporation to better retain water or moisture in an affected area, mixing more of an oil-soluble active ingredient and stably dispersing powder therein.

If the emulsification composition of the present invention is of a water-in-oil emulsification composition, the emulsification composition can be stabilized even if water content by mass is increased, and the water content by mass based on the total amount of the emulsification composition can be, for example, 50% by mass. or more, 60% by mass or more, 70% by mass or more, or 80% by mass or more.

The method for producing the emulsification of the present invention is not particularly limited, and it may be prepared in accordance with a conventional method. Although not particularly limited, in the case of preparing a water-in-oil type (W/O type) emulsification composition, examples of such method include that of mixing a surfactant into an oil agent to uniformly dissolve the same, and then adding and mixing an organic ammonium salt or its aqueous solution thereinto. Meanwhile, in the case of preparing an oil-in-water type (O/W type) emulsification composition, examples of such method include that of mixing a surfactant and an organic ammonium salt or its aqueous solution to uniformly dissolve them, and then adding an oil agent to the mixture.

There are no particular restrictions on the emulsification mixer. Examples of it include, for example, an agitation mixer having propeller wings, paddle wings, turbine wings, anchor wings or ribbon wings; a high-speed agitation disperser such as ultrasonic homogenizer and agitation homogenizer; a high-speed rotary shear-type stirrer; and a high-pressure jet-type emulsifying disperser.

These machines may be combined to perform emulsification via a pre-emulsified step or to make it circulate in order to achieve an effective emulsification.

A composition containing the organic ammonium salt can be a mixing raw material for preparing the composition of the present invention. While there are no particular restrictions on the mode of the composition, there may be employed, for example, a composition with the organic ammonium salt being dissolved or dispersed in, for example, water and/or a solvent.

Although not particularly limited, examples of the solvent include water, methanol, ethanol, propanol, isopropanol, butanol, ethylene glycol, propylene glycol, 1,3-butylene glycol, diethylene glycol, dipropylene glycol, isoprene glycol, hexylene glycol, glycerin, methyl acetate, ethyl acetate, isopropyl acetate, ethyl ether, acetone, toluene, hexane, heptane and acetonitrile; if necessary, two or more of them may be used in combination.

Further, in addition to an oil agent, an emulsification agent, and the organic ammonium salt, the composition of the present invention may also contain other ingredients provided that the effects of the present invention will not be impaired by them. Although not particularly limited, examples of them include, for example, a dye, a pigment, a colorant, a perfume, an inorganic oxide, a thickener, a preservative, a disinfecting agent, a chelate agent, an antioxidizing agent, antioxidant, a moisturizer, a reducing agent, an oxidation agent, a pH adjuster, an ultraviolet absorber, a plant/animal/microorganism extract. Further, various active ingredients may be added for usage in cosmetics, pharmaceuticals, and quasi-drugs, and examples of such active ingredients include, but are not particularly limited to, for example, a whitening agent, vitamins and their derivatives, antiphlogistics, an anti-inflammatory agent, a hair growing agent, a blood circulation promoter, a stimulating agent, hormones, an antiwrinkle agent, an anti-aging agent, a skin-tightening agent, a cold feeling agent, a calefacient, a wound healing promoter, a stimulation alleviating agent, an analgesic, a cellular stimulant, an anti-inflammatory analgesic, an antifungal, an antihistamine agent, antibiotics, an enzyme, a protein, a yeast extract and a nucleic acid (DNA, RNA).

Examples of the dye to be contained in the composition of the present invention include, but are not particularly limited to, oil dyes such as Oil Black 830, Oil Black 860, Oil Black HBB, Valifast Black 1807, Valifast Black 1821, Valifast Black 3806, Valifast Black 3807, Valifast Black 3810, Valifast Black 3820, Valifast Black 3830, Valifast Black 3840, Valifast Black 3866, Valifast Black 3877, Valifast Violet 1705, Nigrosin Base EX; and aqueous dyes such as Water Black R510, Acid Black No. 1, LB4612 Sn M Cyanine 5R(N), LB4910 Sn M Black VLG, LB4921 Sn M Black B(N), LB6980 Any Black F-GL, LC2915 Ly Grey B, LC2922 Ly Grey BG ex cc(N), LC2955 Ly Black BG ex cc, Daiwa Black 6P and Daiwa Black 211.

The organic ammonium used in the present invention salt has a hydrogen-bonding functional group(s) in a cation and/or an anion to thereby provide an excellent affinity with ingredients or compounds having an interaction, such as hydrogen bonding, with their hydrogen-bonding functional groups such that the organic ammonium salt allows them to be dissolved or dispersed therein in high concentration, and the emulsification composition of the present invention, therefore, enables such ingredients or compounds to be contained, dissolved or dispersed therein in high concentration. Likewise, if polymers such as proteins or enzymes are added as active ingredients to the composition, the composition can dissolve or disperse them in high concentration to thereby stabilize the structure.

Among the organic ammonium salts used in the composition of the present invention, those that are liquid at room temperature also function as a solvent, medium, or carrier for other compositions and the above additives.

As for the composition or emulsification composition of the present invention, not only that the organic ammonium salt is used with a surfactant, but it will also suffice if the composition contains an surfactant, and a cation and an anion composing the organic ammonium salt; the organic ammonium salt of the present invention may be a compound produced by preparing the organic ammonium salt in advance, and then mixing the organic ammonium salt with a surfactant, an oil agent, water and/or a solvent, as well as with other ingredients; or by mixing, in any order, individual compounds as the raw materials of a cation and an anion (for example, acid and base) with a surfactant, an oil agent, water and/or a solvent as well as with other ingredients.

WORKING EXAMPLES

The present invention is described in greater detail hereunder with reference to working examples. However, the invention shall not be limited to the following working examples.

As for the organic ammonium salts, surfactants and oils as shown in Tables 1 to 13, those outlined below were used:

(Organic Ammonium Salt)

Compounds 1 to 21 shown in Tables 1 to 12 were synthesized and obtained by the following method(s).

Compounds 1, 2, 4 to 20, and 22 to 27 were synthesized by a method described in JP-A-2014-131975. The structures of the corresponding compounds are as shown in Table 3. As for hydrates, moisture contents thereof are shown in Table 3.

Compound 3: As for 1-(2-hydroxyethyl)-3-methylimidazolium chloride, a reagent produced by Tokyo Chemical Industry Co., Ltd. was used.

Compound 21: As for tetrabutylammonium bromide, a reagent produced by Tokyo Chemical Industry Co., Ltd. was used.

(Surfactant)

As for sorbitan tristearate, NIKKOL SS-30V produced by Nikko Chemicals Co., Ltd. was used.

As for decaglyceryl pentaisostearate, NIKKOL DECAGLYN 5-ISV produced by Nikko Chemicals Co., Ltd. was used.

As for sorbitan sesquiisostearate, NIKKOL SI-15RV produced by Nikko Chemicals Co., Ltd. was used.

As for diglyceryl monooleate, NIKKOL DGMO-CV produced by Nikko Chemicals Co., Ltd. was used.

As for a POE (6) sorbitol beeswax, NIKKOL GBW-25 produced by Nikko Chemicals Co., Ltd. was used.

As for a POE (6) sorbitan tetraoleate, NIKKOL GO-4V produced by Nikko Chemicals Co., Ltd. was used.

As for sodium deoxycholate, the one produced by FUJIFILM Wako Pure Chemical Corporation was used.

(Oil Agent)

As for a liquid paraffin, a reagent produced by FUJIFILM Wako Pure Chemical Corporation was used.

As for a squalane, the one produced by Nikko Chemicals Co., Ltd. was used.

As for ceresin, the one produced by Nikko Rica Corporation was used.

As for a white petroleum, a reagent produced by FUJIFILM Wako Pure Chemical Corporation was used.

As for dodecylbenzene, a reagent produced by Tokyo Chemical Industry Co., Ltd. was used.

As for 2-ethylhexyl palmitate, a reagent produced by FUJIFILM Wako Pure Chemical Corporation was used.

As for tris(2-ethylhexyl) trimellitate, a reagent produced by Tokyo Chemical Industry Co., Ltd. was used.

(Others)

As for glycerin, a reagent produced by KANTO CHEMICAL CO., INC. was used.

As for potassium lactate, a reagent produced by KANTO CHEMICAL CO., INC. was used.

As for sodium lactate, a reagent produced by KANTO CHEMICAL CO., INC. was used.

As for glutamic acid, a reagent produced by FUJIFILM Wako Pure Chemical Corporation was used.

As for gallic acid, a reagent produced by Sigma-Aldrich was used.

1. Composition Containing Organic Ammonium Salt and Surfactant 1-1. Appearance of Composition Compositions of working examples 1 to 11 and comparative example 1 were prepared in accordance with the composition ratios shown in Table 1. After weighing all the ingredients, the mixtures were each stirred and mixed at 80° C. for 3 minutes to obtain a composition.

The forms of the obtained compositions were identified by their appearance or presence of fluidity. The presence of phase separation was identified by their appearance by which evaluation was performed by giving "○" to uniform compositions exhibiting no phase separation; "Δ" to compositions exhibiting partial crystal deposition; and "x" to compositions exhibiting phase separations. The morphology was determined for those in which phase was uniform and separation was not observed, and those having no fluidity were classified as gels, and those having fluidity were classified as fluids.

TABLE 1

| | | Working example 1 | Working example 2 | Working example 3 | Working example 4 | Working example 5 | Working example 6 | Working example 7 | Working example 8 | Working example 9 | Working example 10 | Working example 11 | Comparative example 1 |
|---|---|---|---|---|---|---|---|---|---|---|---|---|---|
| | | Composition ratio (% by mass) | | | | | | | | | | | |
| Organic ammonium salt | Compound 1 m.p.: <−10° C. | 99 | 97 | 95 | 93 | 90 | 70 | 50 | 30 | 10 | | | |
| | Compound 2 m.p.: >25° C. | | | | | | | | | | 90 | | |
| | Compound 3 m.p.: 83° C. | | | | | | | | | | | 90 | |
| | Compound 21 m.p.: 103° C. | | | | | | | | | | | | 90 |
| Surfactant | Diglyceryl monooleate | 1 | 3 | 5 | 7 | 10 | 30 | 50 | 70 | 90 | 10 | 10 | 10 |
| Phase separation (o: No phase separation was identified, Δ: Partial crystal deposition was identified, x: Phase separation was identified) | | o | o | o | o | o | o | o | o | o | Δ | Δ | x |
| Appearance (25° C.) | | Fluid | Fluid | Fluid | Fluid | Gel | Gel | Fluid | Fluid | Fluid | — | — | — |

Table 1 shows that no phase separations were identified in any of the composition ratios in working examples 1 to 9 that use compound 1, and uniform compositions were obtained. Meanwhile, no phase separations were identified in working examples 10 and 11 that use compounds 2 and 3, but the compositions exhibited partial crystal deposition. Phase separation was identified in comparative example 1 that uses compound 21. As a result of comparing compounds 1, 2, 3 with compound 21, it was confirmed that organic ammonium salts having hydrogen-bonding functional groups had a better compatibility with the surfactant and were thus able to yield uniform compositions particularly when the compound was a liquid rather than a solid at 25° C.; as a result of comparing compound 1 with compounds 2, 3, a better compatibility with the surfactant was observed, and uniform compositions were thus obtained in the case of ammonium cations rather than imidazolium cations particularly when the compound was a liquid rather than a solid at 25° C.

Further, among the uniform compositions, working examples 5 and 6 provided immobile gel compositions, and it was found that a gel composition can be prepared with two agents which are an organic ammonium salt having a hydrogen-bonding functional group(s) in a cation and/or an anion; and a surfactant. Further, a gel composition was also obtained from an aqueous material that is diluted to [95:5 (% by mass)]=[composition of working example 5: water]. It was indicated that this was because the hydrogen-bonding functional group of the organic ammonium salt of the present invention forms an aggregate of a higher-order structure with the surfactant and water (hydrated water, free water).

2. Composition Containing Organic Ammonium Salt, Surfactant and Oil Agent 2-1. Appearance of Composition Compositions of the working examples 12 to 25 and comparative examples 2 to 5 were prepared in accordance with the composition ratios shown in Table 2. Specifically, a surfactant and an oil agent(s) were heated to 80° C. and thus uniformly melted. Next, an organic ammonium salt was gradually added while maintaining the temperature, and stirring was performed at 80° C. for 3 min. so as to mix the ingredients. The emulsion was then cooled to 25° C. to obtain a composition.

The morphology of the composition thus obtained was identified by their appearance and presence/absence of mobility. The presence/absence of phase separation was identified by their appearance, and evaluation was performed by giving "o" to uniform compositions exhibiting no phase separation; "Δ" to compositions exhibiting partial crystal deposition; and "x" to compositions exhibiting phase separations. The morphology was identified for those in which phase was uniform and separation was not observed, where those having no fluidity were classified as gels, and those having fluidity were classified as fluids.

TABLE 2A

| | | | | Working example 12 | Working example 13 | Working example 14 | Working example 15 | Working example 16 | Working example 17 | Working example 18 | Working example 19 | Working example 20 |
|---|---|---|---|---|---|---|---|---|---|---|---|---|
| | | | | Composition ratio (% by mass) | | | | | | | | |
| Organic ammonium salt | Compound 1 | m.p.: <−10° C. | | 90 | 90 | 90 | 90 | 90 | 80 | 70 | 60 | 86 |
| | Compound 21 | m.p.: 103° C. | | | | | | | | | | |
| Oil agent | Liquid paraffin | m.p.: <−24° C. | | 7 | | | | | | | | 2 |
| | Squalane | m.p.: <−75° C. | | | 7 | 9 | | | | | | 0.5 |
| | Ceresin | m.p.: 60 to 80° C. | | | | | 7 | | | | | 1 |
| | White petrolatum | m.p.: 36 to 60° C. | | | | | | 7 | 17 | 27 | 37 | 0.5 |
| Surfactant | Diglyceryl monooleate | | | 3 | 3 | 1 | 3 | 3 | 3 | 3 | 3 | 10 |
| Phase separation (o: No phase separation was identified, Δ: Partial crystal deposition was identified, x: Phase separation was identified) | | | | o | o | o | o | o | o | o | o | o |
| Appearance (25° C.) | | | | Fluid | Gel | Gel | Fluid | Gel | Gel | Gel | Gel | Gel |

TABLE 2B

|  |  |  | Working example 21 | Working example 22 | Working example 23 | Working example 24 | Working example 25 | Comparative example 2 | Comparative example 3 | Comparative example 4 | Comparative example 5 |
|---|---|---|---|---|---|---|---|---|---|---|---|
|  |  |  | Composition ratio (% by mass) | | | | | | | | |
| Organic ammonium salt | Compound 1 | m.p.: <−10° C. | 90 | 80 | 50 | 30 | 65 | | | | |
|  | Compound 21 | m.p.: 103° C. | | | | | | 90 | 90 | 90 | 90 |
| Oil agent | Liquid paraffin | m.p.: <−24° C. | 4 | 10 | 25 | 28 | 18.6 | 7 | | | |
|  | Squalane | m.p.: <−75° C. | 0.7 | 2 | 5 | 5.5 | 3.7 | | 7 | | |
|  | Ceresin | m.p.: 60 to 80° C. | 1.6 | 4 | 10 | 11 | 7.5 | | | 7 | |
|  | White petrolatum | m.p.: 36 to 60° C. | 0.7 | 2 | 5 | 5.5 | 3.7 | | | | 7 |
| Surfactant | Diglyceryl monooleate | | 3 | 2 | 5 | 20 | 1.5 | 3 | 3 | 3 | 3 |
| Phase separation (o: No phase separation was identified, Δ: Partial crystal deposition was identified, x: Phase separation was identified) | | | o | o | o | o | o | x | x | x | x |
| Appearance (25° C.) | | | Gel | Gel | Gel | Gel | Gel | — | — | — | — |

As can be seen from Tables 2A and 2B, the compositions of organic ammonium compositions having no hydrogen-bonding functional group(s) in comparative examples 2 to 5 had poor compatibilities with surfactants and exhibited phase separation, while the compositions in working examples having a hydrogen-bonding functional group(s) exhibited no phase separation and provided uniform compositions. Gel compositions with no mobility were obtained in working examples 13, 14, 16 to 25. It is inferred that this was because the organic ammonium salt, the surfactant and the oil agent formed an aggregate of a higher-order structure to induce gelation. As can be seen from working examples 12, 13, 15 and 16, it was found that hydrocarbons, particularly at least mineral oils (petrolatum) or synthetic oils (squalane), tended to be well suited to forming a gel.

3. Composition Containing Organic Ammonium Salt, Surfactant, Oil and Water 3.1. Water-In-Oil Type (W/O Type) Emulsification Composition Emulsion evaluation and evaluation on stability of emulsification compositions of working examples 26 to 67 and comparative examples 6 to 12 were performed in accordance with the composition ratios shown in Tables 3 to 6. Specifically, an oil agent(s) and a surfactant were heated to 80° C. and thus uniformly melted. Next, a product with the organic ammonium salt and water being uniformly dissolved therein was gradually added while maintaining the temperature, and stirring was performed at 80° C. for 3 min before cooling the same to 25° C. Here, after measuring an electrical conductivity of the emulsification composition thus obtained, a low electrical conductivity was observed, and the continuous phase of the composition was confirmed to be an oil phase; it was determined that the emulsification composition obtained was a W/O type emulsion.

The compositions thus obtained were evaluated in terms of emulsified state, and emulsion stabilities 1 and 2 by the following methods.

(Emulsified State Identification)

The formation of emulsification was identified by visually observing the appearances of the compositions of working examples 26 to 67 and comparative examples 6 to 12. Examples in a good emulsified state were given "o" while those exhibiting separation were given "x".

As can be seen from tables 3 to 6, emulsification formations was confirmed in working examples 26 to 67 that contained organic ammonium salts having a hydrogen-bonding functional group(s).

(Emulsification Composition Stability 1)

The obtained emulsification compositions were stored in a thermostatic bath controlled at 50° C. for one week, and changes in emulsified states were then identified by the following standard.

(Emulsification Composition Stability 2)

The obtained emulsification compositions were centrifuged using a centrifugal machine at 2,700 rpm or 13,500 rpm for 1 hour to then evaluate their emulsification stability by the following standard:

o: The emulsified state is maintained favorably.

Δ: The emulsified state is maintained, though partially separated.

x: The emulsified state is collapsed and the emulsion is completely in a separated state.

TABLE 3A

| | | Composition ratio (% by mass) | | | | | | | | | | | Formation of emulsification composition (immediately after preparation) | Emulsification composition stability 1 1 week (50° C.) | Emulsification composition stability 2 | |
|---|---|---|---|---|---|---|---|---|---|---|---|---|---|---|---|---|
| | | Organic ammonium salt (18) $R_4-\overset{R_1}{\underset{R_3}{\overset{+}{N}}}-R_2\ X^-$ | | | | | | | Water (62) | Oil agent (18) | Surfactant (2) | | | | 2700 rpm 1 h | 13500 rpm 1 h |
| | Compound No. | $R_1$ | $R_2$ | $R_3$ | $R_4$ | $X^-$ | Moisture content (wt %) | Melting point (° C.) | | | | | | | | |
| Working example 26 | Compound 4 | $\begin{array}{c}CH_2OH\\|\\-C-H\\|\\CH_2OH\end{array}$ | H | H | H | $CH_3COO^-$ | 19.3 | <−10 | Water | White petrolatum | Diglyceryl monooleate | ○ | ○ | ○ | ○ |
| Working example 27 | Compound 5 | | | | | $HOCH_2COO^-$ | 17.7 | <−0 | | | | ○ | ○ | ○ | ○ |
| Working example 28 | Compound 6 | | | | | $CH_3CH(OH)COO^-$ | 16.6 | <−10 | | | | ○ | ○ | ○ | ○ |
| Working example 29 | Compound 7 | | | | | $HOOC(CH_2)_2COO^-$ | 14.7 | <−10 | | | | ○ | ○ | ○ | ○ |
| Working example 30 | Compound 8 | | | | | $C(OH)(CH_2COOH)_2COO^-$ | 11.3 | <−10 | | | | ○ | ○ | ○ | ○ |
| Working example 31 | Compound 9 | | | | | $BF_4^-$ | 16.8 | <−5 | | | | ○ | ○ | ○ | △ |
| Working example 32 | Compound 10 | | | | | $Cl^-$ | 22.0 | <−10 | | | | ○ | ○ | ○ | △ |
| Working example 33 | Compound 11 | $(CH_2)_2OH$ | H | H | H | | 10.7 | <−10 | | | | ○ | ○ | ○ | △ |
| Working example 34 | Compound 12 | $(CH_2)_2OH$ | $(CH_2)_2OH$ | H | H | | 15.6 | <−10 | | | | ○ | ○ | ○ | △ |
| Working example 35 | Compound 13 | $(CH_2)_2OH$ | $(CH_2)_2OH$ | $(CH_2)_2OH$ | H | | 18.4 | <−10 | | | | ○ | ○ | ○ | △ |

TABLE 3A-continued

| | | Composition ratio (% by mass) | | | | | | | | | | | | Emulsification composition stability 2 | |
|---|---|---|---|---|---|---|---|---|---|---|---|---|---|---|---|
| | | Organic ammonium salt (18) $R_4-\overset{R_1}{\underset{R_3}{N^+}}-R_2\ X^-$ | | | | | | | | | | Formation of emulsification composition (immediately after preparation) | Emulsification composition stability 1 1 week (50° C.) | 2700 rpm 1 h | 13500 rpm 1 h |
| | Compound No. | $R_1$ | $R_2$ | $R_3$ | $R_4$ | $X^-$ | Moisture content (wt %) | Melting point (° C.) | Water (62) | Oil agent (18) | Surfactant (2) | | | | |
| Working example 36 | Compound 14 | $-\underset{\underset{CH_2OH}{\mid}}{\overset{\overset{CH_2OH}{\mid}}{C}}-CH_2CH_3$ | H | H | H | CH₃CH(OH)COO⁻ | 14.7 | <-10 | | | | ○ | ○ | ○ | Δ |
| Working example 37 | Compound 1 | $-\underset{\underset{CH_2OH}{\mid}}{\overset{\overset{CH_2OH}{\mid}}{C}}-CH_2OH$ | H | H | H | | 13.2 | <-10 | | | | ○ | ○ | ○ | ○ |

TABLE 3A

| | | Composition ratio (% by mass) | | | | | | | | | | | | |
|---|---|---|---|---|---|---|---|---|---|---|---|---|---|---|
| | | Organic ammonium salt (18) $R_4 - \overset{R_1}{\underset{R_3}{\overset{|}{N}}} - R_2 \quad X^-$ | | | | | | | | Formation of emulsification composition (immediately after preparation) | Emulsification composition stability 1 1 week (50° C.) | Emulsification composition stability 2 | |
| | Compound No. | $R_1$ | $R_2$ | $R_3$ | $R_4$ | $X^-$ | Moisture content (wt %) | Melting point (° C.) | Water (62) | Oil agent (18) | Surfactant (2) | | | 2700 rpm 1 h | 13500 rpm 1 h |
| Working example 38 | Compound 15 | —CH$_2$CHCHCHCHCH$_2$OH with OH OH OH OH | H | H | H | CH$_3$CH(OH)COO$^-$ | 11.7 | <−10 | Water | White petrolatum | Diglyceryl monooleate | ○ | ○ | ○ | ○ |
| Working example 39 | Compound 16 | CH$_3$ | CH$_3$ | (CH$_2$)$_2$OH | CH$_3$ | | 11.2 | <−10 | | | | ○ | ○ | ○ | △ |
| Working example 40 | Compound 17 | CH$_3$(CH$_2$)$_3$ | CH$_3$(CH$_2$)$_3$ | CH$_3$(CH$_2$)$_3$ | CH$_3$(CH$_2$)$_3$ | | 11.2 | <−5 | | | | ○ | × | × | — |
| Working example 41 | Compound 18 | CH$_2$OH—C(CH$_3$)$_2$— | H | H | H | | 16.7 | <−10 | | | | ○ | ○ | ○ | △ |
| Working example 42 | Compound 19 | CH$_2$OH—C(CH$_3$)(CH$_2$OH)— | H | H | H | | 15.6 | <−10 | | | | ○ | ○ | ○ | △ |

TABLE 3A-continued

| | Compound No. | Organic ammonium salt (18) $R_4-{}^+N(R_1)(R_2)(R_3)\ X^-$ | | | | Moisture content (wt %) | Melting point (° C.) | Water (62) | Oil agent (18) | Surfactant (2) | Formation of emulsification composition (immediately after preparation) | Emulsification composition stability 1 1 week (50° C.) | Emulsification composition stability 2 2700 rpm 1 h | Emulsification composition stability 2 13500 rpm 1 h |
|---|---|---|---|---|---|---|---|---|---|---|---|---|---|---|
| | | $R_1$ | $R_2$ | $R_3$ | $R_4$ | | | | | | | | | |
| Working example 43 | Compound 20 | | | | (ascorbate structure) | 12.0 | <−10 | | | | ? | ? | ? | △ |
| Working example 44 | Compound 2 | —C(CH$_2$OH)$_3$ | H | H | HOCH$_2$COO$^-$ | 15.5 | >25 | | | | ? | ? | ? | △ |
| Comparative example 6 | Compound 21 | Tetrabutylammonium bromide | | | | — | 103 | | | | x | — | — | — |

TABLE 4

| | Composition ratio (% by mass) | | | | Surfactant (2) | Formation of emulsification composition (immediately after preparation) | Emulsification composition stability 1 1 week (50° C.) | Emulsification composition stability 2 2700 rpm 1 h | Emulsification composition stability 2 13500 rpm 1 h |
|---|---|---|---|---|---|---|---|---|---|
| | | | Oil agent (18) | | | | | | |
| Working example 45 | Organic ammonium salt Compound 1 (18) | Water (62) | Hydrocarbons | Liquid paraffin | Diglyceryl monooleate | ○ | ○ | ○ | ○ |
| Working example 37 | | | | White petrolatum | | ○ | ○ | ○ | ○ |
| Working example 46 | | | | Squalane | | ○ | ○ | ○ | x |
| Working example 47 | | | | Dodecylbenzene | | ○ | ○ | ○ | x |
| Working example 48 | | | Waxes | Ceresin | | ○ | ○ | ○ | x |
| Working example 49 | | | | 2-ethylhexyl palmitate | | ○ | ○ | ○ | x |
| Working example 50 | | | Esters | Tris(2-ethylhexyl) trimellitate | | ○ | Δ | Δ | x |
| Working example 51 | | | Fatty acid | Oleic acid | | ○ | Δ | Δ | x |
| Comparative example 7 | — | | Hydrocarbons | Liquid paraffin | | x | — | — | — |
| Comparative example 8 | Glycerin (18) | Water (44) | | | | x | — | — | — |

TABLE 5

| | Composition ratio (% by mass) | | | Surfactant (2) | | | Formation of emulsification composition (immediately after preparation) | Emulsification composition stability 1 1 week (50° C.) | Emulsification composition stability 2 2700 rpm 1 h | Emulsification composition stability 2 13500 rpm 1 h |
|---|---|---|---|---|---|---|---|---|---|---|
| | | | | Name | Type | HLB value | | | | |
| Working example 52 | Organic ammonium salt Compound 1 (18) | Water (62) | White petrolatum (18) | Sorbitan tristearate | Non-ionic surfactant | 2.0 | ○ | Δ | x | — |
| Working example 53 | | | | Decaglyceryl pentaisostearate | | 3.5 | ○ | ○ | ○ | Δ |
| Working example 54 | | | | Sorbitan sesquiisostearate | | 4.5 | ○ | ○ | ○ | Δ |
| Working example 55 | | | | Diglyceryl monooleate | | 5.5 | ○ | ○ | ○ | ○ |
| Working example 56 | | | | POE (6) sorbitol beeswax | | 7.5 | ○ | Δ | x | — |
| Working example 57 | | | | POE (6) sorbitan tetraoleate | | 8.5 | ○ | Δ | x | — |

TABLE 6

| | | Working example 58 | Working example 59 | Working example 60 | Working example 61 | Working example 62 | Working example 45 | Working example 37 | Working example 63 | Working example 64 |
|---|---|---|---|---|---|---|---|---|---|---|
| | | Composition ratio (% by mass) | | | | | | | | |
| | Organic ammonium salt: Compound 1 | 18 | 1 | 30 | 40 | 50 | 18 | 18 | 11.3 | 11.3 |
| | Glycerin | | | | | | | | | |
| | Water | 62 | 79 | 50 | 40 | 30 | 62 | 62 | 38.7 | 38.8 |
| Oil agent | Liquid paraffin | 10 | 10 | 10 | 10 | 10 | 18 | | 25 | |
| | Squalane | 2 | 2 | 2 | 2 | 2 | | | 5 | |
| | Celesin | 4 | 4 | 4 | 4 | 4 | | | 10 | 45 |
| | White petrolatum | 2 | 2 | 2 | 2 | 2 | | 18 | 5 | |
| Surfactant | Diglyceryl monooleate | 2 | 2 | 2 | 2 | 2 | 2 | 2 | 5 | 5 |

TABLE 6-continued

| Formation of emulsification composition (immediately after preparation) | | ○ | ○ | ○ | ○ | ○ | ○ | ○ | ○ | ○ |
|---|---|---|---|---|---|---|---|---|---|---|
| Emulsification composition stability 1 | 1 week (50° C.) | ○ | ○ | ○ | ○ | ○ | ○ | ○ | ○ | ○ |
| Emulsification composition stability 2 | 2700 rpm, 1 h | ○ | ○ | ○ | ○ | ○ | ○ | ○ | ○ | ○ |
| | 13500 rpm, 1 h | ○ | ○ | ○ | ○ | ○ | ○ | ○ | ○ | ○ |

| | | Working example 65 | Working example 66 | Working example 67 | Comparative example 7 | Comparative example 8 | Comparative example 9 | Comparative example 10 | Comparative example 11 | Comparative example 12 |
|---|---|---|---|---|---|---|---|---|---|---|
| | | | | | Composition ratio (% by mass) | | | | | |
| | Organic ammonium salt: Compound 1 | 18 | 7 | 7 | | | | | | |
| | Glycerin | | | | | 18 | | | 7 | |
| | Water | 67.5 | 23 | 23 | 80 | 62 | 50 | 85.5 | 23 | 30 |
| Oil agent | Liquid paraffin | 2.5 | 28 | | 18 | 18 | 25 | 2.5 | 28 | 28 |
| | Squalane | 0.5 | 5.5 | | | | 5 | 0.5 | 5.5 | 5.5 |
| | Celesin | 1 | 11 | 50 | | | 10 | 1 | 11 | 11 |
| | White petrolatum | 0.5 | 5.5 | | | | 5 | 0.5 | 5.5 | 5.5 |
| Surfactant | Diglyceryl monooleate | 10 | 20 | 20 | 2 | 2 | 5 | 10 | 20 | 20 |
| Formation of emulsification composition (immediately after preparation) | | ○ | ○ | ○ | × | × | ○ | ○ | ○ | ○ |
| Emulsification composition stability 1 | 1 week (50° C.) | ○ | ○ | ○ | × | × | ○ | ○ | ○ | ○ |
| Emulsification composition stability 2 | 2700 rpm, 1 h | ○ | ○ | ○ | × | × | × | ○ | ○ | Δ |
| | 13500 rpm, 1 h | ○ | ○ | ○ | × | × | × | × | × | × |

As can be seen from stability 1 of the emulsification composition shown in Tables 3A and 3B, it was found that compound 16 having a hydrogen-bonding functional group(s) in a cation was superior in stability as compared to working example 39 (compound 16) and 40 (compound 17) which have a common anion. Further, as can be seen from the results of stability 2 of the emulsification composition (13,500 rpm), after comparing working examples 26 to 30 (compounds 4 to 8) and working examples 31 (compound 9) and 32 (compound 10) which have a common cation, it was found that compounds 4 to 8 were superior in stability; that is, those of carboxylic acid based anions (having a hydrogen-bonding functional group(s)) were superior in stability to those of halogen-based anions. Further, from a comparison between working example 36 (compound 14) and working example 37 (compound 1), compound 1 having a branched hydroxyalkyl group(s) in a cation wherein the terminals are all hydroxy groups was superior in stability.

Meanwhile, as can be seen from the results of stability 2 of the emulsification composition (2,700 rpm), after comparing working example 39 (compound 16) and working example 40 (compound 17) which have a common anion, compound 16 was found to be superior in stability; that is, it was indicated that an ammonium salt having a hydrogen-bonding functional group(s) in a cation was superior in emulsion stability. That is, it was indicated that a hydrogen-bonding functional group(s) or a carboxylic acid anion in an organic ammonium salt, particularly a carboxylic acid having a hydrogen-bonding functional group(s) has an advantage in emulsification stability.

As can be seen from Table 4, the composition of the present invention was superior in emulsified state and stability as compared to comparative examples 7 and 8. Further, as can be seen from examples 37, and 45 to 51, the organic ammonium salt of the present invention formed an emulsification composition to any oil agents of hydrocarbons, waxes, esters and fatty acids. Meanwhile, in terms of stability, hydrocarbons and waxes were superior, and a liquid paraffin and white petroleum of mineral oil were superior in stability among the hydrocarbons.

As can be seen from Table 5, formation of emulsification composition and stabilities 1 and 2 were confirmed in working examples 52 to 57 in which various non-ionic surfactants of HLB values 1 to 10 were used. Further, as can be seen from the results of stability 1, it was found that non-ionic surfactants having HLB values of 3 to 7 were superior in stability, and that, from the results of stability 2 (13.500 rpm), non-ionic surfactants having HLB values of 5 to 7 were superior.

As can be seen from the results in Table 6, it was confirmed that the emulsification composition was superior in stability in various content. Further, as can be seen from the identified formation of the emulsification composition and the results of stabilities 1 and 2, it was confirmed that the working examples containing the organic ammonium salt were superior to the comparative examples containing only glycerin or water. Furthermore, as can be seen from comparative examples 7 and 8 in comparison with working example 45, it was confirmed that a composition containing no organic ammonium could not provide an emulsified composition.

Next, there were performed an evaluation on solubility of active ingredient and identification of emulsified states in which active ingredients were contained.
(Evaluation on Solubility of Active Ingredient)
Solubilities of active ingredients were evaluated with regard to the compositions shown in Table 7. As the active ingredients, there were used a poorly-soluble gallic acid having an antioxidant effect, and glutamic acid having a moisture retention effect. While the solubility was less than 0.08 g in the cases of the comparative example 14 (glycerin aqueous solution) and comparative example 15 (water) in which glutamic acid had been dissolved, working example 68 exhibited a high solubility of 0.24 g. The comparative examples 17 and 18 in which gallic acid had been dissolved in a similar way exhibited a solubility of 0.08 g while working example 69 exhibited a high solubility of 0.32 g. Further, comparative examples 13 and 16 having no hydrogen-bonding capacity in a cation had poor solubility as compared to the working examples 68 and 69. As can be seen from the above results, the inventive organic ammonium salt having a hydrogen-bonding functional group(s) dissolved larger amounts of an active ingredient.

TABLE 7

|  |  | Working example 68 | Comparative example 13 | Comparative example 14 | Comparative example 15 | Working example 69 | Comparative example 16 | Comparative example 17 | Comparative example 18 |
|---|---|---|---|---|---|---|---|---|---|
| Composition | Compound 1(g) | 1.8 |  |  |  | 1.8 |  |  |  |
|  | Potassium lactate (g) |  | 1.8 |  |  |  | 1.8 |  |  |
|  | Glycerin (g) |  |  | 1.8 |  |  |  | 1.8 |  |
|  | Water (g) | 6.2 | 6.2 | 6.2 | 8 | 6.2 | 6.2 | 6.2 | 8 |
| Solubility | Glutamic acid (g) | 0.24 | 0.16 | <0.08 | <0.08 |  |  |  |  |
|  | Gallic acid (g) |  |  |  |  | 0.32 | 0.16 | 0.08 | 0.08 |

(Identification of Emulsified States in which Active Ingredients are Contained)

As can be seen in Table 8, the dissolved organic ammonium salts/water were each mixed with an oil agent and a surfactant to identify the emulsified state thereof. Examples in a good emulsified state were given "○" while those exhibiting separation were given "x". As can be seen from the evaluation results, they were successfully emulsified. It was confirmed that the working examples provided emulsification compositions containing active ingredients in high concentrations, that the inventive composition containing an organic ammonium salt having a hydrogen-bonding functional group(s) was capable of containing a larger amount of an active ingredient, and that the composition was useful as a solvent or a carrier.

TABLE 8

|  |  | Working example 70 | Working example 71 |
|---|---|---|---|
|  |  | Composition ratio | |
| Organic ammonium salt: Compound 1 | | 18 | 18 |
| Water | | 62 | 62 |
| Oil agent | Liquid paraffin | 10 | 10 |
|  | Squalene | 2 | 2 |
|  | Celesin | 4 | 4 |
|  | White petrolatum | 2 | 2 |
| Surfactant | Diglyceryl monooleate | 2 | 2 |
| Active ingredient | Glutamic acid | 2.4 |  |
|  | Gallic acid |  | 3.2 |
| Formation of emulsification composition (immediately after preparation) | | ○ | ○ |

Next, water retention property, feeling of use and surface resistance of the emulsification composition were tested.

(Water Retention Property)

As is shown in Table 9, emulsified compositions of working examples 72 to 81 and comparative examples 19 to 28 are each weighted to be 0.2 g and put into a vial container. The vial container was then left in a thermostatic bath controlled at 80° C. for 2.5 hours to then calculate the rates of reduction in water content.

TABLE 9

| | Composition ratio (% by mass) | | | | | | | | | Sample quantity (g) | Amount of water prior to heating (g) | Amount of water loss after heating (g) | Water reduction rate [(Amount of water loss after heating/Amount of water prior to heating) × 100] |
|---|---|---|---|---|---|---|---|---|---|---|---|---|---|
| | Organic ammonium salt: Compound 1 | Organic ammonium salt: Compound 16 | Glycerin | Water | Oil agent | | | | Surfactant | | | | |
| | | | | | Liquid paraffin | Squalene | Ceresin | White petrolatum | Diglyceryl monooleate | | | | |
| Working example 72 | 18 | | | 62 | 10 | 2 | 4 | 2 | 2 | 0.20 | 0.12 | 0.10 | 80 |
| Working example 73 | | 18 | | 62 | | | | | | 0.20 | 0.12 | 0.11 | 85 |
| Comparative example 19 | | | 18 | 62 | | | | | | 0.20 | 0.13 | 0.11 | 85 |

TABLE 9-continued

| | Composition ratio (% by mass) | | | | | | | | | Sample quantity (g) | Amount of water prior to heating (g) | Amount of water loss after heating (g) | Water reduction rate [(Amount of water loss after heating/Amount of water prior to heating) × 100] |
|---|---|---|---|---|---|---|---|---|---|---|---|---|---|
| | Organic ammonium salt: Compound 1 | Organic ammonium salt: Compound 16 | Glycerin | Water | Oil agent | | | | Surfactant | | | | |
| | | | | | Liquid paraffin | Squalane | Ceresin | White petrolatum | Diglyceryl monooleate | | | | |
| Comparative example 20 | | | | 80 | | | | | | 0.20 | 0.16 | 0.15 | 93 |
| Working example 74 | 11.3 | | | 39 | 25 | 5 | 10 | 5 | 5 | 0.20 | 0.074 | 0.065 | 88 |
| Working example 75 | | 11.3 | | 39 | | | | | | 0.21 | 0.077 | 0.069 | 89 |
| Comparative example 21 | | | 11.3 | 39 | | | | | | 0.20 | 0.078 | 0.070 | 89 |
| Comparative example 22 | | | | 50 | | | | | | 0.20 | 0.10 | 0.092 | 90 |
| Working example 76 | 18 | | | 68 | 2.5 | 0.5 | 1 | 0.5 | 10 | 0.20 | 0.13 | 0.11 | 84 |
| Working example 77 | | 18 | | 68 | | | | | | 0.21 | 0.14 | 0.13 | 92 |
| Comparative example 23 | | | 18 | 68 | | | | | | 0.20 | 0.14 | 0.13 | 97 |
| Comparative example 24 | | | | 86 | | | | | | 0.20 | 0.18 | 0.17 | 97 |
| Working example 78 | 7 | | | 23 | 28 | 5.5 | 11 | 5.5 | 20 | 0.20 | 0.043 | 0.033 | 75 |
| Working example 79 | | 7 | | 23 | | | | | | 0.21 | 0.046 | 0.037 | 81 |
| Comparative example 25 | | | 7 | 23 | | | | | | 0.20 | 0.046 | 0.041 | 88 |
| Comparative example 26 | | | | 30 | | | | | | 0.20 | 0.061 | 0.059 | 98 |
| Working example 80 | 15 | | | 50 | 18.6 | 3.7 | 7.5 | 3.7 | 1.5 | 0.20 | 0.10 | 0.071 | 74 |
| Working example 81 | | 15 | | 50 | | | | | | 0.20 | 0.10 | 0.077 | 80 |
| Comparative example 27 | | | 15 | 50 | | | | | | 0.20 | 0.10 | 0.079 | 80 |
| Comparative example 28 | | | | 65 | | | | | | 0.20 | 0.13 | 0.12 | 88 |

As can be seen from the results in Table 9 of the rates of reduction in water, it was confirmed that emulsification compositions containing the organic ammonium salts (compounds 1 and 16) were superior in water retention property. It was also confirmed from the comparison between compound 1 and compound 16 that an emulsification composition superior in water retention property was able to be obtained when an organic ammonium salt having a larger number of a hydroxyl group(s) was contained therein.

Further, as the organic ammonium salt used in the present invention is nonvolatile and retains hydrate water having low volatility in a hydrated state, even if an emulsification composition containing a low concentration of organic ammonium salt is applied in a small amount, the composition remains in the applied region to thereby exhibit the effects of water-retaining/moisturizing capacity. Further, since the organic ammonium salt that is liquid at 25° C. is used, it can evenly keep a large amount of water content as a hydrate after applying the emulsification composition, and keep its moisture without forming any precipitation after a certain amount of water is evaporated, and keep its dissolved state without forming any precipitation of active ingredients.

(Feeling of Use)

A given amount of the emulsification composition was put on the skin, followed by evaluating a spreadability when applied thereto, stickiness, moisture retention feeling and skin compatibility of the emulsification composition.

As for the spreadability when applied thereto, evaluation was performed on a scale of 1 to 5, in which 5 was given to examples where the emulsification composition had spread significantly, 3 was given to examples where the emulsification composition had spread, and 1 was given to examples where the emulsification composition had spread unsatisfactorily. Average values of the panel were regarded as evaluation values As for the stickiness after application, the emulsification composition was applied to the skin, and a feeling of the skin after spreading the emulsification composition applied was then evaluated on a scale of 1 to 5, in which 5 was given to examples where no stickiness was felt, 3 was given to examples where stickiness was felt slightly, and 1 was given to examples where stickiness was felt. Average values of the panel were regarded as evaluation values.

As for moisture retention feeling after application, the emulsification composition was applied to the skin, and a feeling of the skin after spreading the emulsification composition applied was then evaluated on a scale of 1 to 5, in which 5 was given to examples where a moisture retention feeling was felt significantly, 3 was given to examples where a moisture retention feeling was felt, and 1 was given to examples where no moisture retention feeling was felt. Average values of the panel were regarded as evaluation values.

A skin compatibility was evaluated on a scale of 1 to 5, in which 5 was given to examples where a favorable compatibility was observed, 3 was given to examples where a compatibility was observed, and 1 was given to examples where a poor compatibility was observed. Average values of the panel were regarded as evaluation values.

TABLE 10A

| | | Working example 82 | Working example 83 | Comparative example 29 | Comparative example 30 | Working example 84 | Working example 85 | Comparative example 31 | Comparative example 32 | Working example 86 | Working example 87 |
|---|---|---|---|---|---|---|---|---|---|---|---|
| | | Composition ratio (% by mass) | | | | | | | | | |
| | Organic ammonium salt: Compound 1 | m.p.: <−10° C. | 18 | | | | 11.3 | | | 18 | | |
| | Organic ammonium salt: Compound 2 | m.p.: >25° C. | | 18 | | | | 11.3 | | | 18 | |
| | Glycerin | | | | 18 | | | | 11.3 | | | |
| | Water | | 62 | 62 | 62 | 8 | 38.8 | 38.8 | 38.8 | 50 | 67.5 | 67.5 |
| Oil agent | Liquid paraffin | | | 10 | | | | 25 | | | 2.5 | |
| | Squalane | | | 2 | | | | 5 | | | 0.5 | |
| | Ceresin | | | 4 | | | | 10 | | | 1 | |
| | White petrolatum | | | 2 | | | | 5 | | | 0.5 | |
| Surfactant | Diglyceryl monooleate | | | 2 | | | | 5 | | | 10 | |
| | | Feeling of use | | | | | | | | | |
| | Spreadability | | 3.8 | 3.7 | 2.8 | 3.0 | 4.0 | 3.8 | 3.6 | 2.6 | 3.0 | 3.2 |
| | Stickiness | | 3.8 | 3.5 | 3.4 | 3.4 | 3.7 | 3.2 | 3.1 | 3.0 | 3.2 | 2.9 |
| | Moisture retention feeling | | 3.8 | 3.5 | 3.4 | 3.4 | 4.2 | 4.1 | 3.8 | 3.8 | 3.6 | 3.3 |
| | Skin compatibility | | 4.0 | 4.0 | 3.4 | 3.6 | 3.9 | 4.0 | 3.8 | 3.2 | 3.4 | 3.4 |

TABLE 10B

| | | Comparative example 33 | Comparative example 34 | Working example 88 | Working example 89 | Comparative example 35 | Comparative example 36 | Working example 90 | Working example 91 | Comparative example 37 | Comparative example 38 |
|---|---|---|---|---|---|---|---|---|---|---|---|
| | | Composition ratio (% by mass) | | | | | | | | | |
| | Organic ammonium salt: | m.p.: <−10° C. | | | 7 | | | | 15 | | | |

TABLE 10B-continued

|  |  | Comparative example 33 | Comparative example 34 | Working example 88 | Working example 89 | Comparative example 35 | Comparative example 36 | Working example 90 | Working example 91 | Comparative example 37 | Comparative example 38 |
|---|---|---|---|---|---|---|---|---|---|---|---|
|  |  | Composition ratio (% by mass) | | | | | | | | | |
|  | Compound 1 Organic ammonium salt: m.p.: >25° C. |  |  | 7 |  |  |  |  | 15 |  |  |
|  | Compound 2 |  |  |  |  |  |  |  |  |  |  |
|  | Glycerin | 18 |  |  |  | 7 |  |  |  | 15 |  |
|  | Water | 67.5 | 85.5 | 23 | 23 | 23 | 30 | 50 | 50 | 50 | 65 |
| Oil agent | Liquid paraffin | 2.5 | | | 28 | | | | 18.6 | | |
|  | Squalane | 0.5 | | | 5.5 | | | | 3.7 | | |
|  | Ceresin | 1 | | | 11 | | | | 7.5 | | |
|  | White petrolatum | 0.5 | | | 5.5 | | | | 3.7 | | |
| Surfactant | Diglyceryl monooleate | 10 | | | 20 | | | | 1.5 | | |
|  |  | Feeling of use | | | | | | | | | |
|  | Spreadability | 2.6 | 3.0 | 4.4 | 4.2 | 3.4 | 3.2 | 3.6 | 3.6 | 3.4 | 3.2 |
|  | Stickiness | 2.8 | 2.8 | 3.8 | 3.1 | 2.8 | 3.0 | 3.8 | 3.2 | 2.8 | 3.1 |
|  | Moisture retention feeling | 3.2 | 3.2 | 4.2 | 4.3 | 3.8 | 3.6 | 3.8 | 3.9 | 3.4 | 3.4 |
|  | Skin compatibility | 2.8 | 2.8 | 4.6 | 4.3 | 3.4 | 3.4 | 3.7 | 3.8 | 3.2 | 3.6 |

As can be seen from Tables 10A and 10B, it was confirmed that the working examples using the organic ammonium salt(s) were superior to the comparative examples, in any of the feelings of use including spreadability, stickiness, moisture retention feeling and skin compatibility. Especially, in the cases of the working examples 84, 85, 88 and 89 containing, as oil agents, large amounts of a liquid paraffin and ceresin, significant improvements were observed in feelings of use on spreadability, moisture retention feeling and skin compatibility. As can be seen from comparison between working examples 82, 84, 86, 88, 90 (compound 1) and working examples 83, 85, 87, 89, 91 (compound 2), it was confirmed that the emulsification compositions containing compound 1 were generally favorable in terms of spreadability, stickiness, moisture retention feeling and skin compatibility, and particularly in terms of stickiness, the emulsification compositions were significantly favorable. That is, feelings of use for the emulsification composition can be improved by adding an organic ammonium salt having the melting point less than 25° C.

(Surface Resistance Measurement)

Surface resistance measurements were performed on compound 1 that had not undergone emulsification adjustment and on glycerin and the emulsification composition that had already undergone emulsification adjustment. In the comparison of compound 1 that had not undergone emulsification adjustment and glycerin, 0.7 g (content in terms of anhydride) of each of the compound 1 and glycerin was applied to an artificial leather made of polyurethane, followed by using a high resistance meter (Stack TR-2 by Tokyo Electronics Co., Ltd.) to measure a surface resistance value. Further, in the comparison by the emulsified composition, 0.05 g of the emulsification compositions shown in Table 11 were each applied to an artificial leather made of polyurethane to measure a surface resistance value using a high resistance meter.

From the results of compounds prior to emulsification adjustment, while the surface resistance value was greater than $4\times10^{11}\Omega$ when nothing had yet been applied thereto, a surface resistance value of lower than $1\times10^{8}\Omega$ was observed in the case of compound 1, and a surface resistance value of $5\times10^{8}\Omega$ was observed in the case of glycerin, provided that the compounds were both in a liquid state at the time of measurement, which indicates that as compared to glycerin, the compound 1 having salt structure is able to bring about a more favorable electrical conductivity on the coating surface, suppress static electricity and impart an antistatic effect.

Further, 0.7 g (content in terms of anhydride) of sodium lactate was applied to an artificial leather made of polyurethane before drying the same to volatilize water. As the result, the coating surface was turned into a solid state whose surface resistance value, measured in a similar manner as above, turned out to be $2\times10^{8}\Omega$; confirmed were a non-volatility of the compound 1 (lower than $1\times10^{8}\Omega$) and an effect of liquidity at 25° C. (capability of evenly coating a coating object).

TABLE 11

|  |  | Working example 92 | Comparative example 39 |
|---|---|---|---|
|  |  | Composition ratio (% by mass) | |
|  | Organic ammonium salt: Compound 1 | 18 | |
|  | Glycerin |  | 18 |
|  | Water | 62 | 62 |
| Oil agent | Liquid paraffin | 10 | 10 |
|  | Squalane | 2 | 2 |
|  | Ceresin | 4 | 4 |
|  | White petrolatum | 2 | 2 |
| Surfactant | Diglyceryl monooleate | 2 | 2 |
|  | Surface resistance value ($\Omega$) | $2 \times 10^{10}$ | $4 \times 10^{10}$ |

Further, as can also be seen, in comparison of emulsified compositions that had undergone emulsification adjustment, from working example 92 and comparative example 39 in table 11, it was confirmed that an emulsification composition containing a non-volatile and liquid organic ammonium salt having a hydrogen-bonding functional group(s) was superior in antistatic performance to an emulsification composition containing glycerin.

3.2. Oil-In-Water Type (O/W) Emulsification Composition (Emulsified States Identification, Emulsification Composition Stability 1, Emulsification Composition Stability 2)

The emulsification compositions of working example 93 and comparative examples 40 and 41 were prepared in accordance with the compositions shown in Table 12. Specifically, the organic ammonium salt or a concentrated glycerin was uniformly dissolved into water at room temperature. Next, an oil agent was gradually added, followed by performing stirring for 3 min. Here, after measuring an electrical conductivity of the emulsion thus obtained, an electrical conductivity at the same level as that of water was observed, and the continuous phase of the emulsion was thus confirmed to be an aqueous phase; it was determined that the emulsion obtained was an O/W type emulsion.

TABLE 12

| | | Working example 93 | Comparative example 40 | Comparative example 41 |
|---|---|---|---|---|
| | | Composition ratio (% by mass) | | |
| | Organic ammonium salt: Compound 1 | 10 | | |
| | Glycerin | | 10 | |
| | Water | 77 | 77 | 87 |
| Oil agent | Liquid paraffin | 10 | 10 | 10 |
| Surfactant | Sodium deoxycholate (Anionic surfactant) | 3 | 3 | 3 |
| Formation of emunification composition (immediately after preparation) | | ? | x | x |
| Emulsification composition stability 1 | 1 week (50° C.) | ? | — | — |

TABLE 12-continued

| | Working example 93 | Comparative example 40 | Comparative example 41 |
|---|---|---|---|
| | Composition ratio (% by mass) | | |
| Emulsification composition stability 2 | 2700 rpm, 1 h | ? | — | — |
| | 13500 rpm, 1 h | ? | — | — |

The appearances of the compositions of working example 93 and comparative examples 40 and 41 were observed to visually identify their emulsification formation, and it was found that the compositions that contained organic ammonium salts having a hydrogen-bonding functional group(s) formed emulsification compositions and were superior in stability.

3.3. Oil-In-Water Type (O/W) Emulsification Composition Containing Additive in Disperse Phase Evaluation on the stability of emulsification and the emulsified compositions having compositions of working examples 94 to 101 were performed in accordance with the compositions shown in Table 13. Specifically, an oil agent(s) and a surfactant were heated to 80° C. and thus uniformly melted. Next, a product with the organic ammonium salt, a dye (Daiwa Black 2H) and water being uniformly dissolved therein was gradually added while maintaining the temperature, and stirring was performed at 80° C. for 3 min before cooling it to 25° C. Here, after measuring an electrical conductivity of the emulsification composition thus obtained, a low electrical conductivity was observed, and the continuous phase of the composition was thus confirmed to be an oil phase; it was determined that the emulsification composition obtained was a W/O type emulsion. As for the evaluation on emulsified states of the obtained compositions, examples in a good emulsified state were given "○" while those exhibiting separation were given "x".

TABLE 13

$$R_4 - \overset{R_1}{\underset{R_3}{\overset{|}{N}}} - R_2 \quad X^-$$

| | $R_1$ | $R_2$ | $R_3$ | $R_4$ | $X^-$ |
|---|---|---|---|---|---|
| | | Water Dye | | | |
| Organic ammonium salt Compound 1 | $CH_2OH$ \| —C—$CH_2OH$ \| $CH_2OH$ | H | H | H | $CH_3CH(OH)COO^-$ |
| Organic ammonium salt Compound 22 | $CH_2OH$ \| —C—$CH_2OH$ \| $CH_2OH$ | H | H | H | $CH_3COO^-$ |
| Organic ammonium salt Compound 23 | $CH_2OH$ \| —C—$CH_2OH$ \| $CH_2OH$ | H | H | H | $CH_3SO_3^-$ |

TABLE 13-continued

| | R1 | R2 | R3 | R4 | Counter-ion |
|---|---|---|---|---|---|
| Organic ammonium salt Compound 24 | $CH_2OH-C(CH_2OH)-CH_2OH$ | H | H | H | $Cl^-$ |
| Organic ammonium salt Compound 25 | $CH_3$ | $CH_3$ | $CH_3$ | $(CH_2)_2OH$ | $HOOC(CH_2)_2COO^-$ |
| Organic ammonium salt Compound 26 | $(CH_2)_2OH$ | $(CH_2)_2OH$ | H | H | $HOCH_2COO^-$ |
| Organic ammonium salt Compound 27 | $CH_2OH-C(CH_2OH)-CH_2OH$ | H | H | H | $CH_3(CH_2)_4CH=CHCH_2CH=CH(CH_2)_7COO^-$ |

Oil agent: Liquid paraffin
Surfactant: Diglyceryl monooleate
Sodium deoxycholate Formation of emulsification composition

| | Working example 94 | Working example 95 | Working example 96 | Working example 97 | Working example 98 | Working example 99 | Working example 100 | Working example 101 |
|---|---|---|---|---|---|---|---|---|
| Composition ratio (% by mass) | | | | | | | | |
| | 59.7 | 55.7 | 55.2 | 56.2 | 59.7 | 59.3 | 61.1 | 76.5 |
| | 0.4 | 0.4 | 0.4 | 0.4 | 0.4 | 0.4 | 0.4 | 0.5 |
| Organic ammonium salt Compound 1 | 6.6 | | | | | | | 10.0 |
| Organic ammonium salt Compound 22 | | 6.2 | | | | | | |
| Organic ammonium salt Compound 23 | | | 6.1 | | | | | |
| Organic ammonium salt Compound 24 | | | | 6.2 | | | | |
| Organic ammonium salt Compound 25 | | | | | 6.6 | | | |
| Organic ammonium salt Compound 26 | | | | | | 6.6 | | |

TABLE 13-continued

| | | | | | | | | |
|---|---|---|---|---|---|---|---|---|
| Compound 26 | | | | | | | | |
| Organic ammonium salt Compound 27 | | | | | | 6.7 | | |
| Oil agent | 17.5 | 16.4 | 16.3 | 16.5 | 17.5 | 17.5 | 11.2 | 10.0 |
| Surfactant | 15.8 | 21.3 | 22.0 | 20.7 | 15.8 | 16.2 | 20.6 | 3.0 |
| | ? | ? | ? | ? | ? | ? | ? | ? |

As is shown in table 13, emulsification compositions were confirmed to have been formed in working examples 94 to 101 that contained an organic ammonium salt to which a hydrogen-bonding functional group(s) is incorporated. From the results as shown above, it was indicated that a composition containing an additive in a dispersion phase can form a stable emulsified composition containing a fluid additive by using an article of the present invention, and that the composition can be used in various materials such as, for example, inks, paints and cosmetics.

The invention claimed is:

1. A composition comprising: an organic ammonium salt having an ammonium cation and an anion; and a surfactant, wherein:
    the ammonium cation is represented by the following formula (I):

$N^+[R^1]_n[R^2]_{4-n}$  [Chemical formula 1]

wherein each $R^1$ independently represents a linear or branched polyhydroxyalkyl group having 1 to 10 carbon atoms and at least three hydroxy groups, and wherein each $R^2$ represents a hydrogen atom, and n represents an integer of 1 to 4;
    the anion is a carboxylic acid-based anion;
    the organic ammonium salt is contained in the composition by an amount of not smaller than 10% by mass;
    the mass ratio of the surfactant and the organic ammonium salt is in the range from 1:99 to 90:10; and
    the surfactant is a nonionic surfactant selected from the group consisting of polyglycerin fatty acid esters, polyoxyethylene sorbitan fatty acid esters, polyoxyethylene sorbitol fatty acid esters, polyoxyethylene lanolin/lanolin alcohol/beeswax derivatives, polyoxyethylene castor oil/hardened castor oil, polyoxyethylene sterols/hydrogenated sterols, polyoxyethylene alkyl ethers, polyoxyethylene polyoxypropylene alkyl ethers, polyethylene glycol fatty acid ester, polyoxyethylene glyceryl isostearates, sorbitan fatty acid esters, glycerin fatty acid esters, diglycerine fatty acid esters and polyglyceryl fatty acid esters.

2. The composition according to claim 1, wherein the composition further comprises an oil agent.

3. The composition according to claim 2, wherein the composition further comprises water, and the composition is an emulsification composition.

4. The composition according to claim 1, wherein an anhydride and hydrate of the organic ammonium salt are liquid at 250G.

5. The composition according to claim 1, wherein the polyhydroxyalkyl group is a branched polyhydroxyalkyl group represented by the following formula:

[Chemical formula 2]

wherein $R^{11}$ represents a linear monohydroxyalkyl group having 1 to 4 carbon atoms.

6. The composition according to claim 5, wherein the polyhydroxyalkyl group is 1,3-dihydroxy-2-hydroxymethylpropane-2-yl group.

7. The composition according to claim 6, wherein n represents an integer of 1 or 2.

8. The composition according to claim 7, wherein the carboxylic acid-based anion is selected from the group consisting of a citrate anion, a lactic acid anion, malic acid anion, ascorbic acid anion, glycolic acid anion, tartaric acid anion, quinic acid anion, acetate anion, butyric acid anion, caproic acid anion, caprylic acid anion, capric acid anion, succinic acid anion, oleic acid anion, linoleic acid anion, alanine anion and glycine anion.

9. The composition according to claim 1, wherein the polyhydroxyalkyl group is pentahydroxyhexane-1-yl group.

10. A composition comprising: an organic ammonium salt having an ammonium cation and an anion; and a surfactant, wherein:
    the ammonium cation is represented by the following formula (I):

$N^+[R^1]_n[R^2]_{4-n}$  [Chemical formula 1]

wherein each $R^1$ independently represents a linear or branched monohydroxyalkyl group having 1 to 10 carbon atoms, and
    wherein each $R^2$ independently represents a hydrogen atom, and n represents an integer of 1 to 4;
    the anion is a carboxylic acid-based anion;
    the organic ammonium salt is contained in the composition by an amount of not smaller than 10% by mass;
    the mass ratio of the surfactant and the organic ammonium salt is in the range from 1:99 to 90:10; and
    the surfactant is a nonionic surfactant selected from the group consisting of polyglycerin fatty acid esters, polyoxyethylene sorbitan fatty acid esters, polyoxyethylene sorbitol fatty acid esters, polyoxyethylene lanolin/lanolin alcohol/beeswax derivatives, polyoxyethylene castor oil/hardened castor oil, polyoxyethylene sterols/hydrogenated sterols, polyoxyethylene alkyl ethers, polyoxyethylene polyoxypropylene alkyl ethers, polyethylene glycol fatty acid ester, polyoxyethylene glyceryl isostearates, sorbitan fatty acid esters, glycerin fatty acid esters, diglycerine fatty acid esters and polyglyceryl fatty acid esters.

11. The composition according to claim 10, wherein $R^1$ is a hydroxymethyl group, 1-hydroxyethyl group or 2-hydroxyethyl group.

12. The composition according to claim 11, wherein the carboxylic acid-based anion is selected from the group consisting of a citrate anion, a lactic acid anion, malic acid anion, ascorbic acid anion, glycolic acid anion, tartaric acid anion, quinic acid anion, acetate anion, butyric acid anion, caproic acid anion, caprylic acid anion, capric acid anion, succinic acid anion, oleic acid anion, linoleic acid anion, alanine anion and glycine anion.

13. The composition according to claim 10, wherein the composition further comprises an oil agent.

14. The composition according to claim 13, wherein the composition further comprises water, and the composition is an emulsification composition.

15. The composition according to claim 10, wherein an anhydride and hydrate of the organic ammonium salt are liquid at 25° C.

* * * * *